United States Patent
Vyas et al.

(10) Patent No.: US 10,272,411 B2
(45) Date of Patent: Apr. 30, 2019

(54) SYSTEM AND METHOD TO RECOVER BYPRODUCTS FROM A HYDROGEN PRODUCTION SYSTEM

(71) Applicant: Cavendish Energy, Chicago, IL (US)

(72) Inventors: Ujjval Vyas, Chicago, IL (US); John Kriegshauser, Chicago, IL (US); Alan Bath, Chicago, IL (US); Regis Luther, Naperville, IL (US)

(73) Assignee: CAVENDISH ENERGY, Fort Worth, TX (US)

( * ) Notice: Subject to any disclaimer, the term of this patent is extended or adjusted under 35 U.S.C. 154(b) by 347 days.

(21) Appl. No.: 14/881,610

(22) Filed: Oct. 13, 2015

(65) Prior Publication Data

US 2017/0101323 A1    Apr. 13, 2017

(51) Int. Cl.
*B01J 7/02* (2006.01)
*B01J 19/00* (2006.01)
*B01J 19/24* (2006.01)
*C01B 3/08* (2006.01)
*C01F 7/42* (2006.01)

(52) U.S. Cl.
CPC ................. *B01J 19/24* (2013.01); *B01J 7/02* (2013.01); *C01B 3/08* (2013.01); *C01F 7/428* (2013.01)

(58) Field of Classification Search
CPC ........ B01J 19/00; B01J 19/24; B01J 2219/24; B01J 7/00; B01J 7/02; C01B 3/00; C01B 3/02; C01B 3/06; C01B 3/08; C01F 7/00; C01F 7/02; C01F 7/42; C01F 7/428
See application file for complete search history.

(56) References Cited

U.S. PATENT DOCUMENTS

| | | | |
|---|---|---|---|
| 5,019,360 A * | 5/1991 | Lehto | C01B 33/24 106/DIG. 1 |
| 8,529,867 B2 * | 9/2013 | Fullerton | B01J 7/02 423/657 |

\* cited by examiner

*Primary Examiner* — Natasha E Young
(74) *Attorney, Agent, or Firm* — Miller, Matthias & Hull LLP

(57) ABSTRACT

The present disclosure is directed to a byproduct recovery system used in conjunction with a hydrogen production system. The hydrogen production system creates hydrogen gas and a byproduct through a chemical reaction. The byproduct of this chemical reaction is then contained within a solution which was part of the chemical reaction. The solution flows from the hydrogen production system into a recovery chamber. Within the recovery chamber the byproduct of the chemical reaction is removed from the solution. The byproduct may then be stored or transported to another outside system remote from both the hydrogen production system and the byproduct recovery system.

14 Claims, 15 Drawing Sheets

| Hydrogen Production System Variable | Range of Operation Constraints (1000) |
|---|---|
| 930 Surface Area | Unbounded |
| 950 Temperature | 10° – 200° Celsius |
| 970 Molarity (Caustic Concentration) | 0.1 M – 8 M |
| 990 Solubility (Moles of the Caustic / Moles of the Metallic or Semi-Metal Material) | Greater than 1 |

Figure 11

SYSTEM AND METHOD TO RECOVER BYPRODUCTS FROM A HYDROGEN PRODUCTION SYSTEM

FIELD OF DISCLOSURE

The present disclosure relates to a system and method for the recovery of byproducts from a hydrogen production system, and more particularly the recovery of aluminum hydroxide ($Al(OH)_3$) from a hydrogen production system.

BACKGROUND OF THE DISCLOSURE

Hydrogen gas is by far the most plentiful element in the universe, having the lowest atomic number of all other elements. Though plentiful in general, hydrogen is not plentiful on earth in an easily-used state. The majority of hydrogen on earth is chemically bonded to oxygen in water. Moreover, most hydrogen that is not bound in water is chemically bound in other more complex forms such as hydrocarbons. Considering water, it is possible to break the bond between hydrogen and oxygen to obtain hydrogen in its elemental form (H+) or a diatomic form ($H_2$). In this document, both forms will be generally referred to as the elemental form for hydrogen.

The ability to obtain elemental hydrogen is critical to many industries. In the chemical industry, hydrogen is frequently used to produce ammonia for use in agricultural fertilizer. Hydrogen is also used in the production of plastics and pharmaceuticals, and is an important element in many oil-refining processes. In the food industry, hydrogen can form hydrogenated oils from fats for uses in butter substitutes like margarine, thus delaying spoilage. In the electronics industry, hydrogen provides an excellent flushing gas during the manufacture of silicon chips.

Of greater current interest, hydrogen has been described as the fuel of the future and this is a reasonably accurate description. Hydrogen can be used as feedstock to hydrogen fuel cells, which produce electricity while producing only clean water as a byproduct. Similarly, the combustion of hydrogen in an internal combustion engine leaves only water as a byproduct.

The foregoing are but a small sampling of the uses to which elemental hydrogen may be put. Nonetheless, it remains a challenge to produce hydrogen in a clean and cost-effective manner. Known methods for producing hydrogen gas include steam reformation—using a hydrocarbon feed stock such as methane—and electrolysis, which uses electricity to break the hydrogen-oxygen bond.

Steam reformation is currently the predominant method of hydrogen production, and involves reacting steam ($H_2O$) with methane ($CH_4$) in an endothermic reaction to yield syngas, a fuel gas mixture consisting primarily of hydrogen, carbon monoxide, and some carbon dioxide. Electrolysis, which is the secondary means for producing hydrogen, involves applying an electric voltage in water. The voltage disassociates the hydrogen and oxygen to produce gaseous hydrogen.

Current production methods used to create and capture hydrogen have many limitations. The cost of these production methods are extremely high for the yield of hydrogen that they produce. Furthermore, the energy input used to produce hydrogen within these production means vastly exceeds the energy output of the hydrogen produced. Also, industrial production of hydrogen is a costly endeavor focusing on the use of expensive specialized machinery. Therefore it would be advantageous for one to develop a method and production system of hydrogen gas that can maintain a low capital and operational cost, yield a high percentage of pure hydrogen gas, and if possible through the production process, produce a byproduct having additional economic value.

While the present disclosure is directed to a system that can eliminate some of the shortcomings noted in this Background section, it should be appreciated that any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize the prior art. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

SUMMARY OF THE DISCLOSURE

In one aspect of the disclosure, a byproduct recovery system is disclosed. The byproduct recovery system has a hydrogen production system with contains a caustic dissolved within water. The hydrogen production system also has a metallic or semi-metal material in contact with the solution to produce a chemical reaction. The chemical reaction of the hydrogen production system produces both hydrogen gas and a byproduct. The byproduct recovery system also has a solution flow path allowing the solution to leave the hydrogen production system. The solution leaving the hydrogen production system has a byproduct contained within the solution after the chemical reaction has occurred. The solution flow path leads to a recovery chamber. The recovery chamber is able to receive the solution containing the byproduct and remove the byproduct from the solution.

In another aspect of the disclosure, a byproduct recovery system is disclosed. The byproduct recovery system has a reactor vessel. The reactor vessel may then have a hydrogen extraction point located on the reactor vessel. A solution may be presented filling at least a portion of the interior of the reactor vessel. The solution contains at least a predetermined amount of caustic in water such that the predetermined amount of caustic dissolves within the water. Also, a metallic or semi-metal material is present. The metallic or semi-metal material consists essentially of a predetermined amount of metallic or semi-metal material. The metallic or semi-metal material is placed within the interior of the reactor vessel and exposed to the solution to produce both hydrogen gas and a byproduct. The byproduct recovery system also has a solution flow path allowing the solution to leave the reactor vessel. The solution leaving the reactor vessel has a byproduct contained within the solution after the chemical reaction has occurred. The solution flow path leads to a recovery chamber. The recovery chamber is able to receive the solution containing the byproduct and remove the byproduct from the solution.

In yet another aspect of the disclosure, a method of recovering a byproduct from a hydrogen production system is disclosed. A reactor vessel is proved to contain a chemical reaction to produce both hydrogen and a byproduct. The byproduct is then contained within a solution used to produce the chemical reaction. The solution containing the byproduct is then transported out of the reactor vessel and into a recovery chamber. Finally, within the recovery chamber the byproduct is recovered from the solution. The recovery chamber operates to separate the byproduct from the solution by removing the byproduct out of the solution.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

FIG. 11 is a table of a range of operation constraints for each the surface area variable, temperature variable, molarity variable, and solubility variable used in the operation of the hydrogen production system in accordance with an embodiment of the disclosed principles;

DETAILED DESCRIPTION OF THE EMBODIMENTS

Before presenting a detailed discussion of embodiments of the disclosed principles, an overview of certain embodiments is given to aid the reader in understanding the later discussion.

Figure 1:
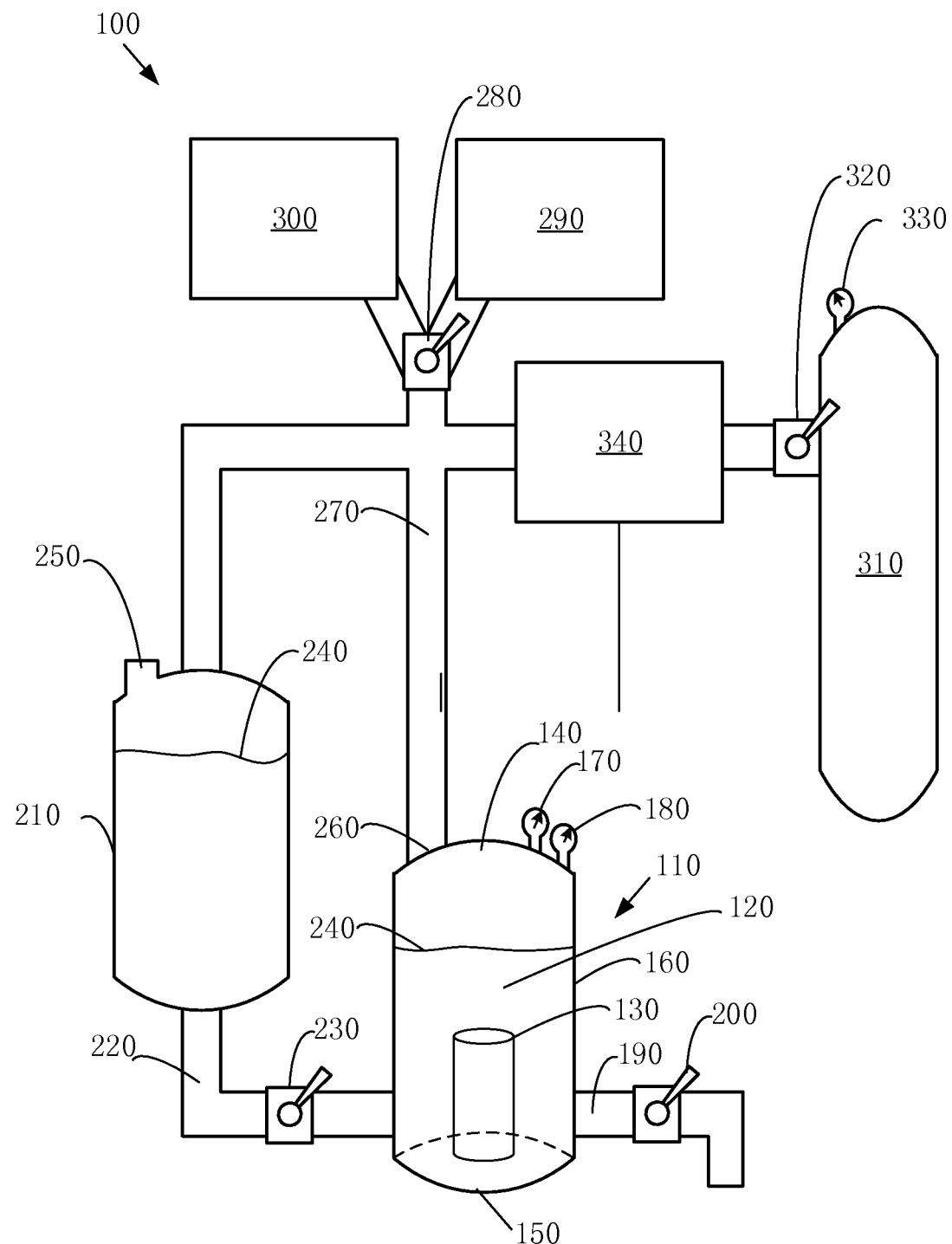
FIG. 1 is plain view of core components of the hydrogen production system in accordance with an embodiment of the disclosed principles.

FIG. 1 is a depicted representation of the core of the hydrogen production system 100 100. At the core of the hydrogen production system 100 a reactor vessel 110 is needed. The reactor vessel 110 may be any type of container which is suitable to contain a chemical reaction. The shape and size of the reactor vessel 110 can be adjusted and manipulated for the exact application and environment needed for the hydrogen. The reactor vessel 110 may be made of a sturdy material, such as but not limited to a metallic alloy, which can contain both a solution 120 and a metallic or semi-metal material 130 inside the reactor vessel 110. The reactor vessel 110 may also be constructed in such a way that pressure contained from a chemical reaction will not affect the structural integrity of the reactor vessel 110. Also, the material which is used to create the reactor vessel 110 may have a chemical composition and alignment to contain the byproducts of the chemical reaction so that the byproducts cannot seep into the material of the reactor vessel 110 or deteriorate the structural integrity of the reactor vessel 110.

The reactor vessel 110 has at least a top portion 140 and a bottom portion 150 in an embodiment, and takes any of a multitude of cross-sectional shapes including but not limited to a cylinder, square, rectangle, or triangle. The reactor vessel 110 may also have an interior chamber which may hold the components of a chemical reaction. The bottom portion 150 of the reactor vessel 110 is attached to the sides 160 of the reactor vessel 110. The top portion 140 of the reactor vessel 110 may be either part of the formed reactor vessel 110 or, in an alternate embodiment, fashioned from a covering device (not shown). The covering device (not shown) may be a lid, cap, canopy or seal or the like placed over the top portion 140 of the reactor vessel 110 and attached to the sides 160 of the reactor vessel 110. The covering device (not shown) can be removed or have an opening(s) to place within the reactor vessel 110 the components of the chemical reaction sought. Fastening devices (not shown) such as but not limited to clips and clamps may be positioned on the sides 160 of the reactor vessel 110 to hold the covering device (not shown) on the top portion 140 of the reactor vessel 110. If however the top portion 140 of the reactor vessel 110 is formed as part of the reactor vessel 110, a feeding mechanism or actuator (not shown) may be employed to allow the chemical materials to enter the reactor vessel 110.

A solution 120 is placed inside the reactor vessel 110 in an embodiment of the disclosed principles. This solution 120 includes water ($H_2O$) as well as a caustic. The caustic is any of a variety of caustic substances, and is introduced into the solution 120 in either a liquid or solid form. If introduced in a solid form, the caustic has the ability to dissolve into the water as to adequately disperse the caustic throughout the solution 120. The caustic producing the best results within the hydrogen production system 100 is sodium hydroxide (NaOH), however a variety of other caustics which react with any of the below described metallic or semi-metal material 130 may be used. The solution 120 which is placed inside the reactor vessel 110 fills at least part of the interior chamber of the reactor vessel 110.

Additionally, a metallic or semi-metal material 130 is placed inside the interior chamber of the reactor vessel 110. The metallic or semi-metal material 130 is placed inside the reactor vessel 110 in such a fashion so that the solution 120 adequately contacts the metallic or semi-metal material 130. The metallic or semi-metal material 130 is a material which chemically reacts with the solution 120 to produce at least hydrogen gas as a byproduct. Examples of such metallic or semi-metal materials 130 include but are not limited to aluminum, ferrosilicon, copper, iron, magnesium, and zinc. When using the caustic of sodium hydroxide (NaOH), the best results were found using aluminum (Al) as the metallic or semi-metal material 130 for the hydrogen production system 100. The details and models of the chemical reaction occurring within the reactor vessel 110 will be disclosed in greater detail below.

On the top portion 140 of the reactor vessel 110, or on the covering device (not shown), there may be a temperature gauge 170. When the solution 120 and metallic of semi-metal material 130 react within the reactor vessel 110, one of the chemical reaction byproducts produced is heat causing an increase in temperature. In an effort to stabilize and maintain the chemical reaction between the solution 120 and the metallic or semi-metal material 130, a temperature gauge 170 is present which measures the temperature of the solution 120 within the reactor vessel 110. The temperature gauge 170 reports to the user of the hydrogen production system 100 the operating temperature of the chemical reaction taking place. Reporting the temperature in such a manner alerts the user to increases and decreases in temperature and the ability to react accordingly if cooling or heating of the reactor vessel 110 is needed.

Also included on either the top portion 140 of the reactor vessel 110 or on the covering device (not shown) is a pressure gauge 180. Like an increase in temperature, an increase in pressure occurs when the chemical reaction takes place within the reactor vessel 110. As the chemical reaction creates a product of hydrogen gas, that hydrogen gas increases the pressure within the reactor vessel 110. The pressure gauge 180 reports to the user of the hydrogen production system 100 the pressure within the reactor vessel 110. This allows the user the opportunity to know when to release hydrogen from the reactor vessel 110, thereby lowering the pressure for proper operation of the hydrogen production system 100.

At the bottom of the reactor vessel 110 a drainage output 190 may be present. The drainage output 190 on the reactor vessel 110 allows the solution 120 within the reactor vessel 110 to be removed from the reactor vessel 110. The drainage output 190 may connect to a drain valve 200. The drain value is a regular value having and open and closed position. When the drain valve 200 is placed in an open position, the solution 120 flowing from the reactor vessel 110 through the drainage output 190 will then flow through the drain valve 200 and into either another outside system or storage container effectively removing the solution 120 from the reactor vessel 110. If the drain valve 200 is placed in the closed position, the drain valve 200 blocks the flow of the solution 120 within the reactor vessel 110 so that none of the solution 120 may leave the reactor vessel 110.

The drain valve 200 and drainage output 190 have two distinct functions within the hydrogen production system 100. The drain valve 200 and the drainage output 190 allow for the emergency evacuation of the solution 120 from the reactor vessel 110 if the temperature or pressure reaches a critical or uncontrollable level. Additionally, the drainage output 190 and drain valve 200 may be connected to other outside systems such as a filter 530 (not shown), or a storage tank (not shown) to either store or filter 530 the solution 120 for later use or recycling of byproducts produced by the chemical reaction.

Still referring to FIG. 1, a reservoir vessel 210 is disposed remotely from the reactor vessel 110. The reservoir vessel 210 is connected to the reactor vessel 110 by a fluid passage 220 to allow for the solution 120 to freely flow between the two vessels. The fluid passage 220 may be made with a tube, or another linking agent which sufficiently connects the two vessels while adequately protecting and not inhibiting the flow of the solution 120 between the two vessels. The fluid passage 220 connects to the bottom of the reservoir vessel 210 and to the lower part of the side portion 160 of the reactor vessel 110. Located on the fluid passage 220 is a fluid valve 230. The fluid valve 230 is a regular value having and open and closed position and allows for the flow of fluid between the two vessels. When the fluid valve 230 is placed in an open position, the solution 120 flowing from the reservoir vessel 210 through the fluid passage 220 will then flow into the reactor vessel 110. If the fluid valve 230 is placed in the closed position, the fluid valve 230 blocks the flow of the solution 120 from the reservoir vessel 210 to the reactor vessel 110.

The solution 120 may travel through the fluid passage 220 from the reservoir vessel 210 to the reactor vessel 110 either based on gravity or Bernoulli's principle of fluid dynamics. This flow adds the solution 120 to the reactor vessel 110. If the solution level 240 of both the reactor vessel 110 and the reservoir vessel 210 are not level with one another, the volume of the solution 120 in each vessel can be adjusted accordingly so that they are equal.

The reservoir vessel 210 may also have a reservoir opening 250 of some sort on the top portion of the reservoir vessel 210. This reservoir opening 250 facilitates the addition of solution 120 to the reservoir vessel 210. This reservoir opening 250 can also be used to add either water or the caustic to the solution 120 depending on the needs of the user operating the hydrogen production system 100. The reservoir opening 250 may have a covering (not shown) such as but not limited to a cap, lid, or seal that can be removed to allow the addition of material or secured to the top portion of the reservoir opening 250 to form a seal.

Referring back to the reactor vessel 110 as seen in FIG. 1, there may be a hydrogen extraction point 260 located in the top portion 140 of the reactor vessel 110 or the covering device (not shown). The hydrogen extraction point 260 is fashioned either into the covering device (not shown) placed over top portion 140 of the reactor vessel 110 or into the top portion 140 of the reactor vessel 110 itself. Additionally, the hydrogen extraction point 260 is, in an alternate embodiment, fashioned into the upper sides of the reactor vessel 110. The hydrogen extraction point 260 is operable to allow hydrogen gas to pass through the hydrogen extraction point 260. As hydrogen gas is a product of the chemical reaction occurring within the reactor vessel 110, the hydrogen gas must have a means of leaving the reactor vessel 110 for collection and use.

A multitude of devices may attach to the hydrogen extraction point 260. One such device is a hydrogen flow path 270 in which the hydrogen gas is led away from the reactor vessel 110. The hydrogen flow path 270 may be constructed with a tube, or another linking agent which sufficiently protects the flow of hydrogen and does not inhibit the flow of hydrogen to outside linked sources.

As the hydrogen flow path 270 leaves the reactor vessel 110, the hydrogen flow path 270 may connect to the top portion of the reservoir vessel 210. This connection of the hydrogen flow path 270 between the reactor vessel 110 and the reservoir vessel 210 allows for the equalization of pressure between the two vessels. As pressure builds by the chemical reaction within the reactor vessel 110, the hydrogen leaves the reactor vessel 110 through the hydrogen extraction point 260 and flows through the hydrogen flow path 270 and into the reservoir vessel 210. This flow equalizes the pressure between the two vessels. This allows the solution 120 to flow through the fluid passage 220 to operate on Bernoulli's principle adding additional solution 120 to the reactor vessel 110 if needed.

Also attached to the hydrogen flow path 270 may be a purge valve 280. The purge valve 280 exists to remove unwanted contaminants or ambient air from the hydrogen production system 100. When the hydrogen production system 100 is assembled, ambient air, including any contaminants, fills the free space above the solution 120 in each the reactor vessel 110 and the reservoir vessel 210. As the chemical reaction occurs in the reactor vessel 110, hydrogen is produced to add pressure to the hydrogen production system 100. The purge value is a regular value having and open and closed position. When the purge valve 280 is placed in an open position, the ambient air and hydrogen within each the reactor vessel 110 and the reservoir vessel is removed from the hydrogen production system 100 as the pressure build up releases this ambient air and hydrogen through the purge valve 280 and into the atmosphere 290. If the purge valve 280 is placed in the closed position, the purge valve 280 closes the hydrogen flow path 270 allowing the pressure within the hydrogen production system 100 to build based on the chemical reaction occurring in the reactor vessel 110.

Unlike the above descripted purge of the hydrogen production system 100 into the atmosphere 290, the purge valve 280 may also connect to a vacuum pump 300. The vacuum pump 300 operates to remove the ambient air from the hydrogen production system 100. When the purge valve 280 is placed in an open position, the vacuum pump 300 operates to suck out and remove the ambient air from the hydrogen flow path 270 as well as both the reservoir vessel 210 and the reactor vessel 110.

The removal of the ambient air from these components creates a clean vacuum space which can later be filled with hydrogen gas when the chemical reaction occurs. If the purge valve 280 is placed in the closed position, the purge valve 280 blocks access to the vacuum pump 300 and closes the hydrogen flow path 270 allowing the pressure within the hydrogen production system 100 to build based on the chemical reaction occurring in the reactor vessel 110.

The hydrogen flow path 270 may also connect to a multitude of additional components dependent on the user's intended use of the hydrogen gas. Commonly, the hydrogen flow path 270 will end with a connection to a containment vessel 310. The containment vessel 310 may be any vessel acceptable and configured for the storage of hydrogen gas. The containment vessel 310 may take on any of a multitude of cross-sectional shapes including but not limited to a cylinder, square, rectangle, or triangle. The hydrogen produced by the chemical reaction within the reactor vessel 110 would then flow through the hydrogen flow path 270 and become stored within the containment vessel 310.

A hydrogen flow valve 320 may be employed at the point the hydrogen flow path 270 connects to the containment vessel 310. In an open position, the hydrogen flow valve 320 would allow hydrogen to flow into the containment vessel 310. However, in a closed position, the hydrogen flow valve 320 would close the hydrogen flow path 270 effectively sealing the hydrogen gas within the containment vessel 310.

A hydrogen pressure gauge 330 may also be attached to the containment vessel 310. The hydrogen pressure gauge 330 can adequately determine the pressure of the hydrogen within the containment vessel 310. When an acceptable pressure, based on the user's wishes, has been reached within the containment vessel 310, the user may turn the hydrogen flow valve 320 to the closed position to store the hydrogen within the containment vessel 310. The containment vessel 310 could then be removed from the hydrogen production system 100 and transported or stored for later use.

Additionally, the hydrogen flow path 270 may connect to a desiccator 340 before continuing on to the containment vessel 310. The chemical reaction, which will be discussed in detail below, consumes water during hydrogen production. Heat is also a byproduct of the chemical reaction. Because the chemical reaction occurring in the reactor vessel 110 consumes the water within the solution 120 as well as heats the solution 120 there is a chance that water may evaporate from its liquid medium and become the gaseous medium of water vapor. This water vapor would travel with the hydrogen gas through the hydrogen extraction point 260 and hydrogen flow path 270 towards the containment vessel 310. Running this mixture of hydrogen gas and water vapor through the desiccator 340 before the containment vessel 310 removes the water vapor from the mixture of hydrogen gas and water vapor. By removing the water vapor in this fashion only pure hydrogen gas enters and is contained within the containment vessel 310.

As stated above the hydrogen flow path 270 can lead to a multitude of specific outputs for the use of hydrogen gas. Some of these outputs, the desiccator 340 and containment vessel 310, are the most common uses for the production and containment of the produced hydrogen gas. The hydrogen flow path 270, in an additional embodiment, may also lead to an incendiary device (not shown) that may produce a flame with the extracted hydrogen gas. Additionally, the hydrogen flow path 270, in another additional embodiment, may lead to a power generation unit (not shown) that uses the extracted hydrogen gas as fuel. Furthermore, the hydrogen flow path 270, in yet another additional embodiment, may lead to an airship device (not shown) that uses the hydrogen gas for lift and buoyance. The outputs of the hydrogen flow path 270 are endless depending on the personal wishes of the user employing the hydrogen production system 100. The above examples are illustrative at best and are not to be considered as the full range of exemplary situations where the hydrogen flow path 270 may conclude.

Figure 2:
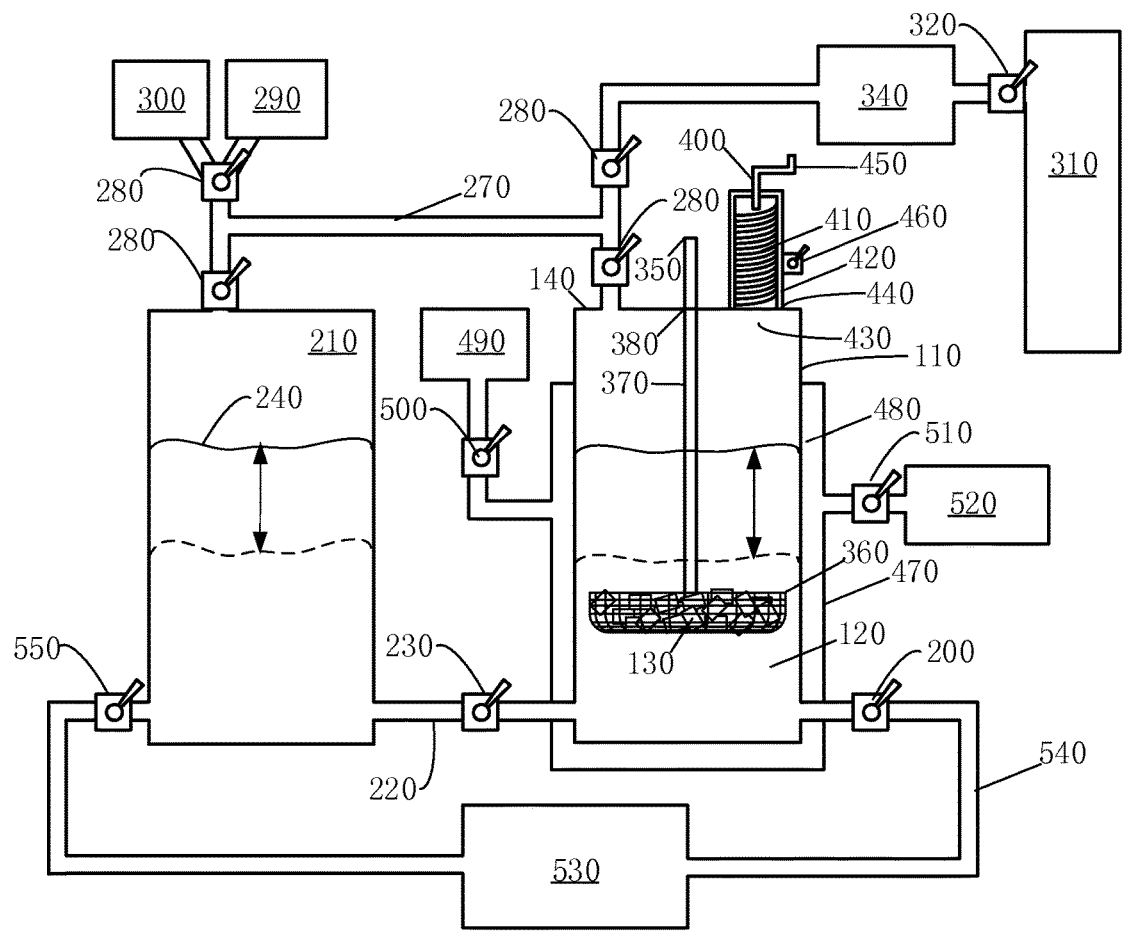
FIG. 2 is a more detailed plain view of the hydrogen production system of FIG. 1, in accordance with an embodiment of the disclosed principles.

Turning now to FIG. 2, the hydrogen production system 100 is shown in greater detail. The hydrogen production system 100 of FIG. 2 contains the same core elements as FIG. 1 including the reactor vessel 110, reservoir vessel 210, desiccator 340 and containment vessel 310. FIG. 2, however, provides a more detailed view of the relationships and interconnections between these components. The reactor vessel 110 as seen in FIG. 2 is manufactured as a complete enclosure and does not have a covering device on the top portion of the reactor vessel 110. The top portion 140 of the reactor vessel 110 is part of the reactor vessel 110 itself. Inside the interior of the reactor vessel 110 the solution 120 can be seen with the metallic or semi metal material. The metallic or semi metal material is suspended within the interior of the reactor vessel 110 by a lowering device 350.

In the embodiment of FIG. 2, the lowering device 350 is a mesh wire basket 360 which can hold the metallic or semi-metal material 130. The lowering device 350 is manufactured from a non-reactive material to the chemical reaction such as but not limited to stainless steel. A shaft portion 370 of the lowering device 350 protrudes through the top portion of the reactor vessel 110 through a lowering device opening 380. The shaft portion 370 of the lowering device 350 may be configured to raise the lowering device 350 up and down within the reactor vessel 110. By moving the lowering device 350 up and down within the reactor vessel 110, a user of the hydrogen production system 100 can regulate the amount of metallic or semi-metal material 130 that is in contact with the solution 120. Through this action, the chemical reaction occurring within the reactor vessel 110 can be controlled.

On the right top portion for the reactor vessel 110 a feeding mechanism or actuator 390 is present. The feeding mechanism or actuator 390 as presented in the embodiment disclosed within FIG. 2 is a linear actuator such as a crank shaft 400 connected to a removable metallic or semi-metal magazine 410. During operation, the removable metallic or semi-metal magazine 410 may be loaded within the crank shaft compartment 420. The removable metallic or semi-metal magazine 410 may contain chips or pieces of the metallic or semi-metal material 130 to be fed into the reactor vessel 110. The removable metallic or semi-metal magazine 410 has a corkscrew shape. The corkscrew shape allows for the crank shaft 400 to spin the removable metallic or semi-metal magazine 410 and gradually feed the metallic or semi-metal material 130 into the interior of the reactor vessel 110. Once the removable metallic or semi-metal magazine 410 is loaded into the crank shaft compartment 420, the crank shaft compartment 420 is attached to the right top portion 430 of the reactor vessel 110 by a series of crank shaft fasteners 440. This secures the crank shaft compartment 420 to the reactor vessel 110 and provides a suitable seal preventing the release of the hydrogen gas around the edges of the seal. A crank 450 is located and attached at the top portion of the crank shaft 400. The crank 450 may be manual or automatically spun by the user or an operating machine to gradually feed metallic or semi-metal material 130 into the reactor vessel 110. Additionally, located to one side and attached to the crank shaft compartment 420 is a crank shaft valve 460. The crank shaft valve 460 like the other valves described above has both an open and a closed position. When the crank shaft valve 460 is in the open position, air or hydrogen gas may be purged from the interior of the crank shaft compartment 420 and released through the crank shaft valve 460. If the crank shaft valve 460 is in the closed position, a seal is formed preventing the release of hydrogen gas from the hydrogen production system 100 through the crank shaft valve 460.

As seen in FIG. 2, the reactor vessel 110 is placed within a cooling container 470. The cooling container 470 may be a multitude of sizes and shapes depending on the needs of the hydrogen production system 100. The cooling container 470 should be large enough to contain the reactor vessel 110 comfortably as well as provide adequate space for a cooling agent 480 to fill the void between the reactor vessel 110 and the cooling container 470. In an embodiment of the present disclosure, a cooling agent 480 that may be used is water. As stated earlier, a byproduct of the chemical reaction occurring within the reactor vessel 110 is heat. That heat may cause the reaction within the reactor vessel 110 to become unstable and uncontrollable. By using the cooling container 470 filled with the cooling agent 480, the reactor vessel 110 can be adequately cooled by removing the produced heat from the reactor vessel 110.

The cooling agent 480 may be held within a cooling agent storage 490. In an embodiment of the present disclosure, this cooling agent storage 490 may be a tank of water or the like. The cooling agent 480 would then flow through a cooling agent input valve 500 into the interior of the cooling container 470. This flow would adequately fill the cooling container 470 with the cooling agent 480. The cooling agent input valve 500 is a simple open or closed position valve which would control the flow of the cooling agent 480 from the cooling agent storage 490 into the cooling container 470. While the cooling agent 480 is present within the cooling container 470, heat is transferred from the reactor vessel 110 into the cooling agent 480. This in turn heats up the cooling agent 480. If water is used as the cooling agent 480, this process may cause the water to heat to a temperature allowing the water to boil and transform into water vapor. On the opposite end of the cooling container 470 is a cooling agent output valve 510. The cooling agent output valve 510 allows the flow of the cooling agent 480, which has been heated, out of the cooling container 470. When the cooling agent 480 has been heated it is no longer effective as a cooling agent 480. Therefore, it must be removed from the cooling container 470. The cooling agent output valve 510 having a simple open and closed position provides an adequate exit point for the cooling agent 480. The heated cooling agent 480 may then follow a cooling agent flow path 520 to be used in other systems, such as but not limited to heat engines or the driving of a turbine. In other embodiments, the cooling agent 480 may follow a cooling agent flow path 520 to be discarded, recycled, stored, or used in other useful applications.

Above both the reactor vessel 110 and the reservoir vessel 210 the hydrogen flow path 270 can be seen. The hydrogen flow path 270 may have a series of purge valves 280 located along its piping structure. These purge valves 280, as stated earlier, may be used to remove ambient air or hydrogen from the hydrogen production system 100. This removal can be accomplished in two different ways. First the hydrogen flow path 270 may be purged when the hydrogen production system 100 becomes pressurized by releasing the ambient air and hydrogen into the atmosphere 290. Secondly, the hydrogen flow path 270 may be connected to a vacuum pump 300. By opening the proper purge valves 280, the ambient air will be sucked out and removed from the hydrogen production system 100 by the vacuum pump 300.

Below both the reactor vessel 110 and the reservoir vessel 210 is a byproduct recovery system 530. The hydrogen production system 100 of FIG. 2 is designed to be a self-sustaining enclosed system. To accomplish these means, the solution 120 which is part of the chemical reaction within the reactor vessel 110 may need to be cleaned or filtered by having a byproduct of the chemical reaction removed before returning to the reactor vessel 110. When the chemical reaction takes place within the reactor vessel 110, one byproduct of the chemical reaction is aluminum hydroxide ($Al(OH)_3$). Depending on the variable factors associated with the chemical reaction, the aluminum hydroxide $Al(OH)_3$ may either dissolve into the solution 120 or form various types of precipitates depending on overall system conditions. The byproduct recovery system 530 is present to remove the $Al(OH))_3$ from the solution 120 so that when the solution 120 is reused, the solution can maintain and hold additional aluminum hydroxide $Al(OH)_3$ The details of the byproduct recovery system 530 will be described in greater detail below and may be viewed in enclosed FIG. 5.

Figure 3:
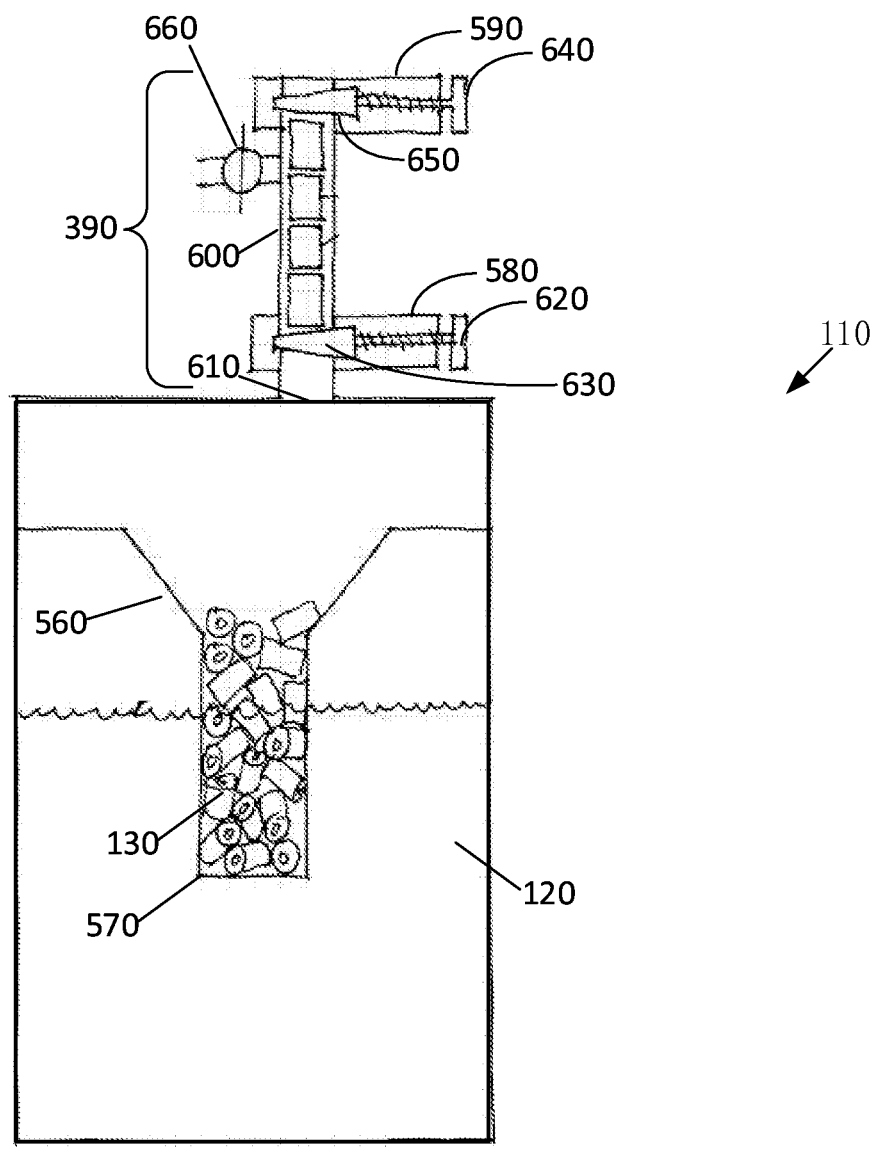
FIG. 3 is a detailed view of an alternate reactor vessel of the hydrogen production system in accordance with an embodiment of the disclosed principles.

Turning now to FIG. 3, an alternate embodiment of the reactor vessel 110 is shown. The reactor vessel 110 like those disclosed in each FIG. 1 and FIG. 2 may be used within the hydrogen production system 100. The reactor vessel 110 of FIG. 3, depicts the solution 120 filling the interior of the reactor vessel 110 and the metallic or semi-metal material 130 suspended within the solution 120. Attached to the interior of the reactor vessel 110 is a funneling device 560. The funneling device 560, in an embodiment of the present disclosure, may be a mesh basket 570 attached to the interior of the reactor vessel 110. The mesh basket 570 may be made of any material that does not adversely affect the chemical reaction within the reactor vessel 110. In an embodiment of the present disclosure this material may be stainless steel. The funneling device 560 holds the metallic or semi-metal material 130, and suspends the metallic or semi-metal material 130 within the solution 120.

On the top portion of the reactor vessel 110 a feeding mechanism or actuator 390 is present. The feeding mechanism or actuator 390 as presented in FIG. 3 consists of a plurality of gate valves 580 and 590 with a holding compartment 600 located between each of the gate valves 580 and 590. Where the feeding mechanism or actuator 390 attaches to the top portion 140 of the reactor vessel 110 a feed opening 610 is present. The feeding mechanism or actuator 390 may either be fashioned into the top portion 140 of the reactor vessel 110 through the manufacture process or attached to the top portion 140 of the reactor vessel 110 through the use of feeding mechanism fasteners (not shown). Above the feed opening 610 the first gate valve 580 of the plurality of gate valves 580 and 590 is present. The first gate valve 580 acts to hold the metallic or semi-metal material 130 in place above the first gate valve 580 within the holding compartment 600. To activate the first gate valve 580, a user or a machine may pull the first handle 620 of the first gate valve 580 to remove the first pin 630 from the holding compartment 600. When the first pin 630 is removed from the holding compartment 600, the metallic or semi-metal material 130 within the holding compartment 600 falls into the interior of the reactor vessel 110. The metallic or semi-metal material 130 then follows the funneling device 560 inside of the reactor vessel 110 to arrive at the bottom of the funneling device 560.

At the top end of the holding compartment 600, a second gate valve 590 of the plurality of gate valves 580 and 590 is present. The second gate valve 590 acts as the loading mechanism to add metallic or semi-metal material 130 to the holding compartment 600. To activate the second gate valve 590, a user or a machine may pull the second handle 640 of the second gate valve 590 to remove the second pin 650 from the holding compartment 600. When the second pin 650 is removed from the holding compartment 600, the metallic or semi-metal material 130 may then be added to the holding compartment 600. Loading the holding compartment 600 in such a way provides a steady supply of metallic or semi-metal material 130 to the reactor vessel 110 allowing the chemical reaction to be maintained and adjusted based on the wishes and directives of the operator of the hydrogen production system 100. Additionally, a holding compartment purge valve 660 may be present on a side of the holding compartment 600. The holding compartment purge valve 660 may have an open and closed position operable to remove pressurized hydrogen gas from the holding compartment 600 that may have traveled up into the holding compartment 600 when the first gate valve 580 of the plurality of gate valves 580 and 590 was open.

Figure 4:
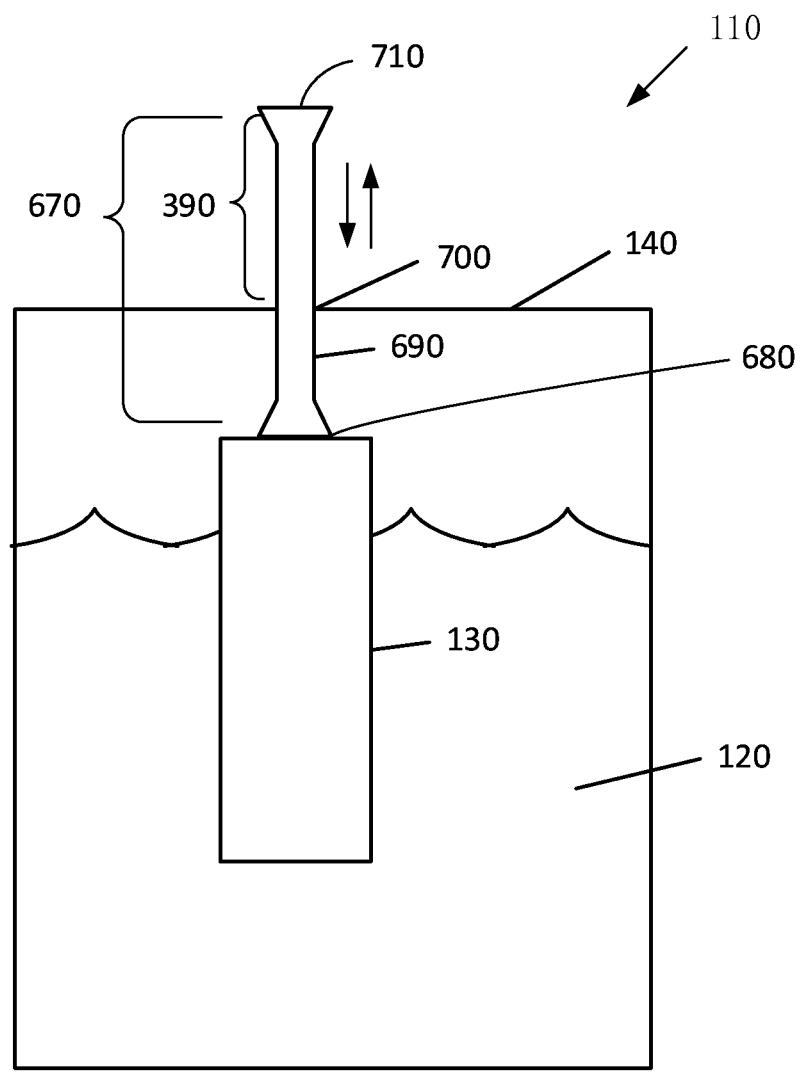
FIG. 4 is a detailed view of an alternate reactor vessel of the hydrogen production system in accordance with an embodiment of the disclosed principles.

Turning now to FIG. 4, another alternate embodiment of the reactor vessel 110 is shown. The reactor vessel 110 like those disclosed in each FIG. 1, FIG. 2, and FIG. 3 may be used within the hydrogen production system 100. The reactor vessel 110 of FIG. 4, depicts the solution 120 filling the interior of the reactor vessel 110 and the metallic or semi-metal material 130 suspended within the solution 120. On the top portion 140 of the reactor vessel 110 a feeding mechanism or actuator 390 is present.

The feeding mechanism or actuator 390 as presented in FIG. 4 consists of another linear actuator represented by a plunging mechanism 670 attached to the metallic or semi-metal material 130. At the bottom of the plunging mechanism 670, a plunging attachment 680 attaches the metallic or semi-metal material 130 to the plunging mechanism 670. In this embodiment of the present disclosure the metallic or semi-metal material 130 can be fashioned in a cylindrical, square or block fashion as a large chunk of the metallic or semi-metal material 130. Attached to the plunging attachment 680 is a plunging shaft 690. The plunging shaft 690 runs through the interior of the reactor vessel 110 and through the top portion 140 of the reactor vessel 110. A plunging seal 700 is formed around the top portion 140 of the reactor vessel 110 and the plunging shaft 690. This plunging seal 700 allows for movement of the plunging shaft 690 in a vertical direction while also creating a seal that does not allow the escape of hydrogen gas from the interior of the reactor vessel 110. At the top end of the plunging shaft 690 is a plunging handle 710. The plunging handle 710 can be depressed or extended by either a user or a machine. By depressing or extending the plunging handle 710 the metallic or semi-metal material inside the reactor vessel 110 can be modulated.

Figure 5:
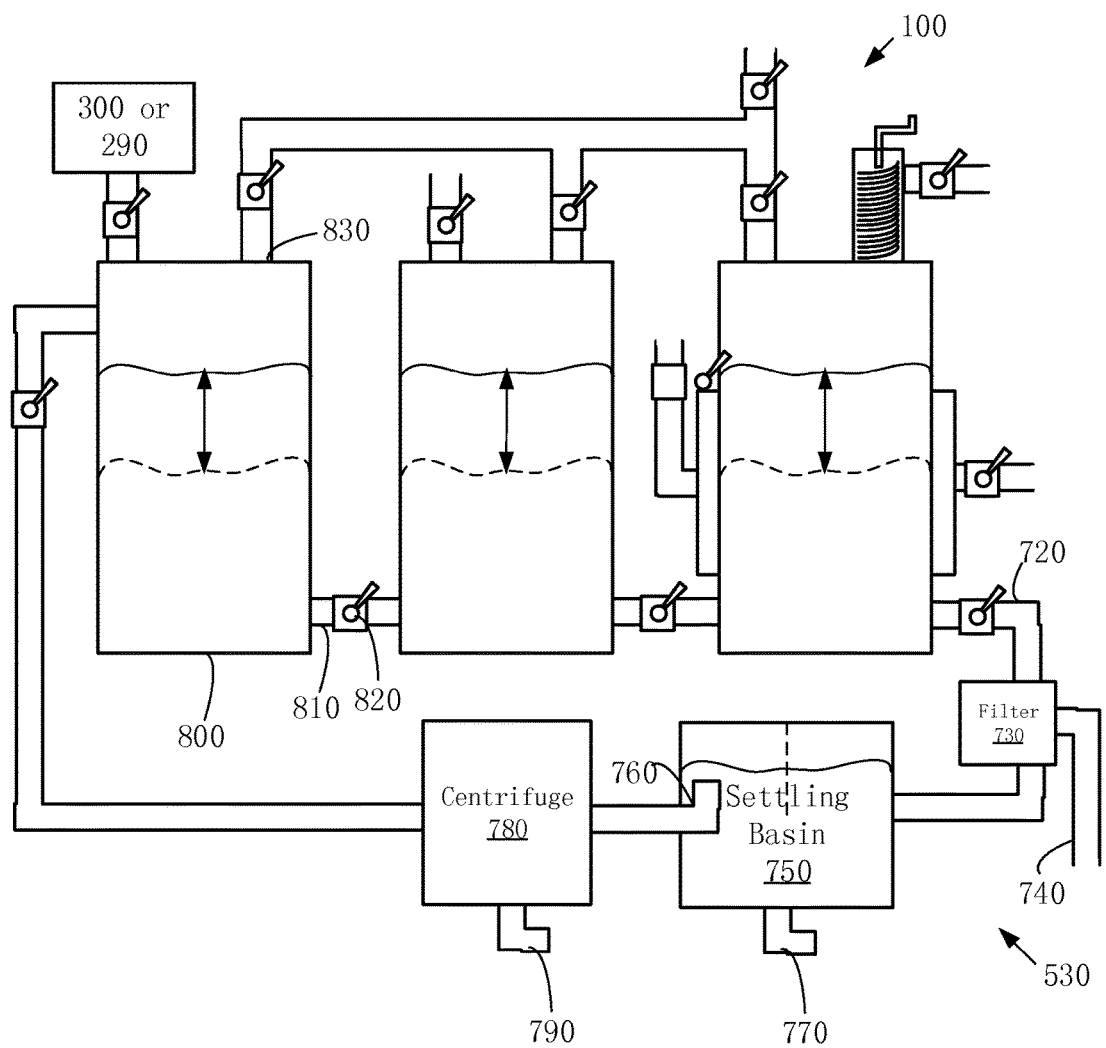
FIG. 5 is a detailed view of the of the hydrogen production system of FIG. 2 having a byproduct recovery system attached to the hydrogen production system in accordance with an embodiment of the disclosed principles.

Referring now to FIG. 5, FIG. 5 provides a detailed view of both the hydrogen production system 100 and the byproduct recovery system 530. The hydrogen production system 100 of FIG. 5 contains the same elements as disclosed in FIG. 2. FIG. 5, however, provides a more detailed view of the byproduct recovery system 530 and its relationship and interconnection with the hydrogen production system 100. As seen in FIG. 5, a solution flow path 720 connects the reactor vessel 110 to a filter 730 as the solution flow path 720 leaves the reactor vessel 110. The solution 120 within the reactor vessel 110 may be rich with a byproduct of the chemical reaction, such as aluminum hydroxide Al(OH)$_3$, and can flow into the solution flow path 720 and through the drain valve 200. The drain valve 200 as described above has and on and an off position regulating the flow of the solution 120 through the solution flow path 720. Once the solution 120 has passed the drain valve 200 the solution 120 will enter the filter 730 of the byproduct recovery system 530. Within the filter 730, the aluminum hydroxide Al(OH)$_3$ is removed from the solution 120. The filter 730 may execute the task of removing other insoluble products from the solution 120 other than the chemical reaction byproduct. When the metallic or semi-metal material 130 is consumed by the chemical reaction, there is a chance that the metallic or semi-metal material 130 may contain some insoluble products within the solution 120. These insoluble products may remain and settle within the solution 120. When the solution 120 enters the filter 730, the solution 120 will have the insoluble products removed. Additionally, the filter 730 may have a filter output 740 connected to either the side or bottom of the filter 730. This filter output 740 provides a path for the removal of the insoluble products from the filter 730 if the filter 730 needs to be cleaned or replaced.

From the filter 730, the solution 120 follows the solution flow path 720 to a settling basin 750. Within the settling basin 750, the solution 120 is collected for storage over an extended period of time. The settling basin 750 may be any type of container which is suitable to contain the solution 120. The shape and size of the settling basin 750 can be adjusted and manipulated for the exact application and environment needed based on the operational wishes of the user of the hydrogen production system 100. The settling basin 750 may be made of a sturdy material, such as but not limited to a metallic alloy, which can contain both the solution 120 and the byproducts of the chemical reaction inside the interior of the settling basin 750. Also, the material which is used to create the settling basin 750 may have a chemical composition and alignment to contain the byproducts of the chemical reaction so that the byproducts cannot seep into the material of the settling basin 750 or deteriorate the structural integrity of the settling basin 750.

Within the settling basin 750 the solution 120 is allowed to sit for a period of time. As the solution 120 sits, the byproducts of the chemical reaction will precipitate out of the solution 120 and settle at the bottom of the settling basin 750. In an embodiment of the present disclosure, the byproduct that settles is aluminum hydroxide $Al(OH)_3$. Also attached to the settling basin 750 is a settling basin output 760. The settling basin output 760 extends horizontally into the settling basin 750 and then extends upward. The settling basin output 760 is open at the top of the upward extension and acts as a drain input within the settling basin 750 for the solution 120. As solution 120 enters the settling basin 750, the solution 120 gradually increases in level towards the top of the settling basin 750. As the solution 120 gradually increases, the time it takes for the solution 120 to fill the settling basin 750 allows the byproduct to precipitate out of the solution 120 and settle at the bottom of the settling basin 750. When the solution level rises above the upward extension of the settling basin output 760, the solution 120 now without a majority of the byproduct flows out of the settling basin 750 and into the settling basin output 760. The settling basin output 760 then continues the solutions flow along the solution flow path 720.

At the bottom of the settling basin 750 a byproduct output 770 may be present. The byproduct output 770 allows the byproduct collected within the settling basin 750 to be removed from the settling basin 750. After the byproduct is removed from the settling basin 750 the byproduct may either be collected in a remote storage tank (not shown) or moved to another outside application (not shown) for operational use. Furthermore, this byproduct output 770 may provide access to the settling basin 750 for cleaning and maintenance purposes.

After leaving the settling basin 750 a majority of the byproduct within the solution 120 will have been removed. The solution 120 will then flow along the solution flow path 720 into a centrifuge chamber 780. The centrifuge chamber 780 allows for another opportunity to remove byproducts or insoluble products from the solution 120 which might have been missed in either the filter 730 or the settling basin 750. As solution 120 enters the centrifuge chamber 780, the solution 120 is spun at a high velocity. Spinning the solution 120 at a high velocity removes any remaining byproducts from the solution 120 as well as removing any remaining insoluble products from the solution 120. After a spin cycle is complete within the centrifuge chamber 780, the solution 120 leaves the centrifuge chamber 780 through a continuation of the solution flow path 720.

At the bottom of the centrifuge chamber 780 a centrifuge output 790 may be present. The centrifuge output 790 allows the byproduct or insoluble product collected within the centrifuge chamber 780 to be removed from the centrifuge chamber 780. After the byproduct or insoluble product is removed from the centrifuge chamber 780 the byproduct or insoluble product may either be collected in a remote storage tank (not shown) or moved to another outside application (not shown) for operational use. Furthermore, this centrifuge output 790 may provide access to the centrifuge chamber 780 for cleaning and maintenance purposes.

After leaving the centrifuge chamber 780, the now cleaned and recycled solution 120 follows the solution flow path 720 into a holding vessel 800. The holding vessel 800 is any type of container which is suitable to contain the solution 120 which has been cleaned by the byproduct recovery system 530. The holding vessel 800 is disposed remotely from both the reactor vessel 110, and the reservoir vessel 210. The holding vessel 800 may be connected to the reservoir vessel 210 by a clean fluid passage 810 to allow for the solution 120 to freely flow between the two vessels. The clean fluid passage 810 may be made with a tube, or another linking agent that sufficiently connects the two vessels while adequately protecting and not inhibiting the flow of the solution 120 between the two vessels. The clean fluid passage 810 connects to the bottom of the holding vessel 800 and to the bottom of the reservoir vessel 210. Located on the clean fluid passage 810 is a clean fluid valve 820. The clean fluid valve 820 is a regular value having and open and closed position and allows for the flow of solution 120 between the two vessels. When the clean fluid valve 820 is placed in an open position, the solution 120 flowing from the holding vessel 800 through the clean fluid passage 810 will then flow into the reservoir vessel 210. If the clean fluid valve 820 is placed in the closed position, the clean fluid valve 820 blocks the flow of the solution 120 from the holding vessel 800 to the reservoir vessel 210.

At the top of the holding vessel 800, the holding vessel 800 may have a holding connection 830 to connect to the hydrogen flow path 270. By connecting to the hydrogen flow path 270, the holding vessel 800 may become pressurized by the hydrogen production occurring within the reactor vessel 110. Additionally, this holding connection 830 allows the holding vessel 800 to be degassed by either a vacuum pump 300 or through expulsion into the atmosphere 290 based on the operation of any of a series of purge valves 280 which are connected to the hydrogen flow path 270.

The hydrogen production system 100 as described above relies on the chemical reaction occurring within the reactor vessel 110. Within the reactor vessel 110 a metallic or semi-metal material 130 is introduced into a solution 120. As stated above, the metallic or semi-metal material 130 used in this embodiment of the present disclosure is aluminum (Al). As for the solution 120, the solution 120 of the present disclosure is a combination of water ($H_2O$) and a caustic. In this embodiment of the present disclosure the caustic being used is sodium hydroxide (NaOH). The use of this metallic or semi-metal material 130 and caustic should not be interpreted as a limiting factor of the hydrogen production system 100. Other metallic or semi-metal materials 130 and caustics may be used, yet additional calculations and adjustment may be made to their respective ratios for production rate and yield purposes.

Figure 6:
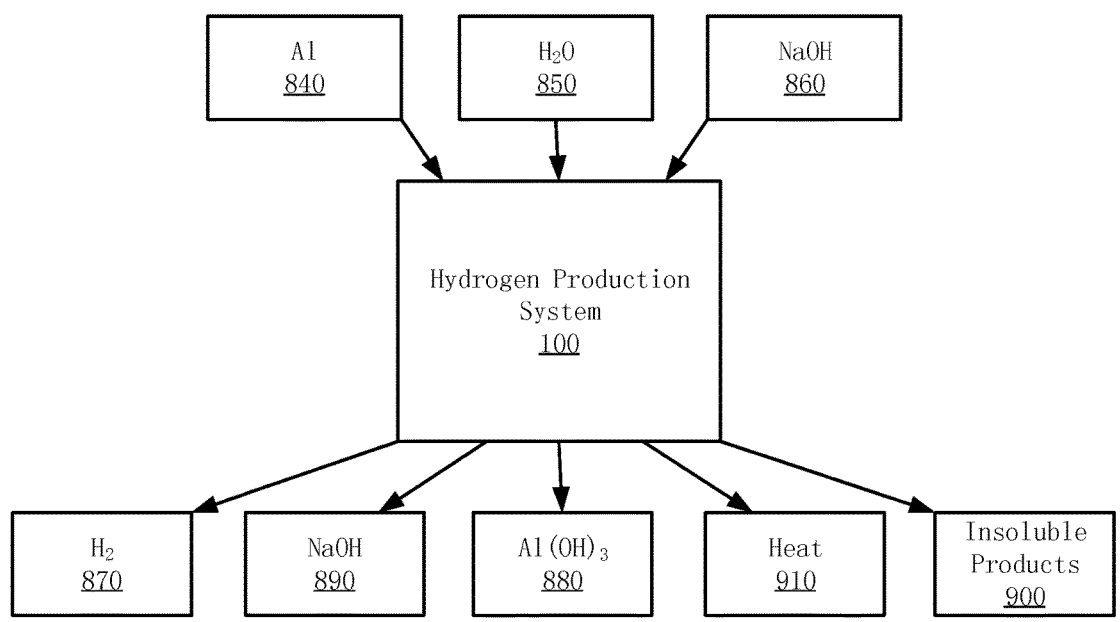
FIG. 6 is a block view of the chemical reaction produced within the reactor vessel of the hydrogen production system in accordance with an embodiment of the disclosed principles.

FIG. 6 provides a block view of the chemical reaction produced within the reactor vessel 110 of the hydrogen production system 100. Aluminum (Al) 840, water (H₂O) 850, and sodium hydroxide (NaOH) 860 can be seen as inputs to the chemical reaction within the hydrogen production system 100. The middle block of FIG. 6 represents the chemical reaction occurring through use of the hydrogen production system 100. Finally, the outputs of chemical reaction of the hydrogen production system 100 can be seen in blocks representing hydrogen (H₂) 870, aluminum hydroxide (Al(OH)3) 880, sodium hydroxide (NaOH) 890, insoluble products 900, and heat 910.

The stoichiometric equation representing the chemical reaction within the reactor vessel 110 may be represented by the following equation.

$$2Al+6H_2O \rightarrow 2Al(OH)_3+3H_2$$

Within the reactor vessel 110, the aluminum (Al) reacts with the solution 120 containing water (H₂O) and sodium hydroxide (NaOH). After the chemical reaction occurs, the products and byproducts which result are aluminum hydroxide (Al(OH)₃), hydrogen (H₂), heat, and possible insoluble products. It can be seen from this equation that the sodium hydroxide (NaOH) is not consumed by this chemical reaction. The sodium hydroxide (NaOH) acts as a catalyst. This helps to aid the ongoing chemical reaction. The specific chemical reaction that occurs within the reactor vessel 110 involves the interaction between the water (H₂O) and the aluminum (Al). The aluminum (Al) reacts with the water (H₂O) and splits the water (H₂O) molecules into OH— and H₂. The aluminum (Al) combines with the OH— to create aluminum hydroxide (Al(OH)₃). The left over hydrogen (H₂) is then released in its gaseous state. The released hydrogen (H₂) from this chemical reaction is the hydrogen obtained and collected by the hydrogen production system 100.

To determine the best yield and production rates for hydrogen when using this hydrogen production system 100 significant testing and calculations were completed. This resulted in the discovery of four distinct yet interrelated variables which are used within the hydrogen production system 100 for control of the chemical reaction, production rate of hydrogen, and determination of the yield rate of hydrogen. These four variables are surface area, temperature, molarity, and solubility.

Figure 7:
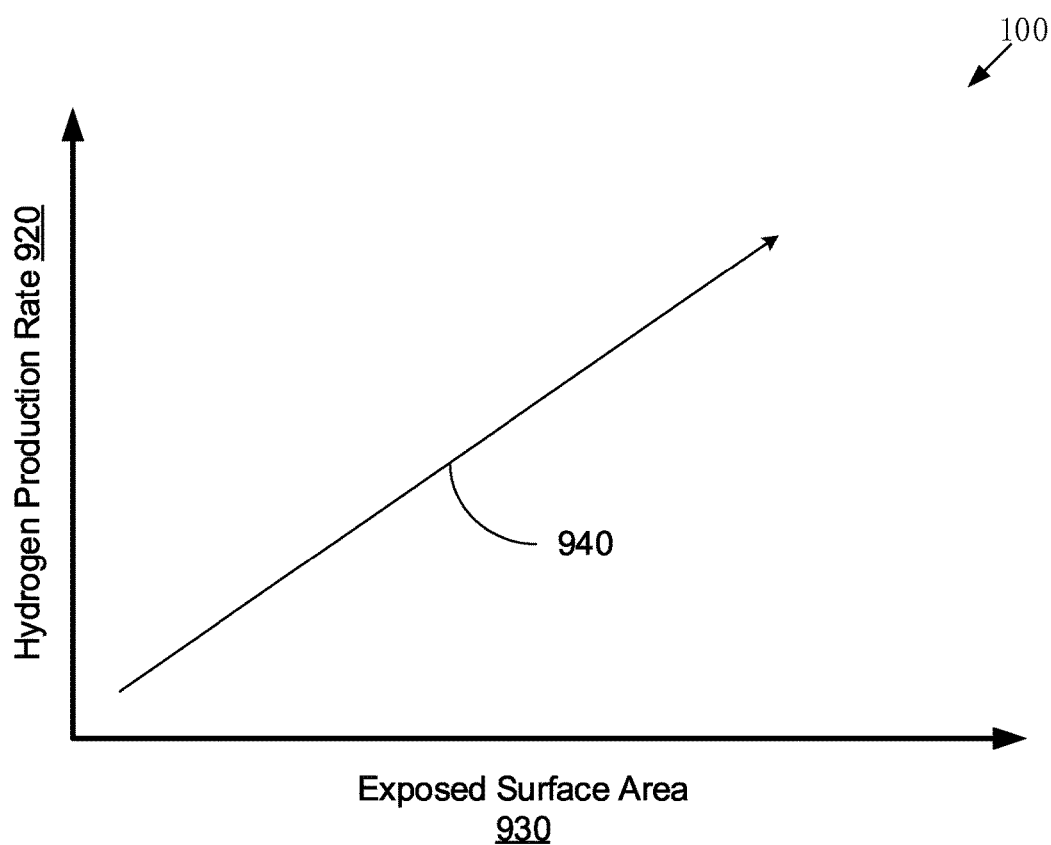
FIG. 7 is a graphical representation of a surface area variable of the chemical reaction in the hydrogen production system in accordance with an embodiment of the disclosed principles.

FIG. 7 shows a graphical representation of the hydrogen production rate 800 within the hydrogen production system 100 in relation to surface area 810. Dedicated testing and experimentation determined that surface area 810 is an important control variable regarding the production rate 920 of hydrogen. It was found that the surface area 930 of the aluminum (Al) exposed to the solution 120 had a linear relationship 940 with the hydrogen production rate 920. As more surface area 930 was exposed to the solution 120, the rate of production 920 increases proportionally to the amount of surface area 930 exposed. Therefore, exposing more or less surface area 930 of aluminum (Al) to the solution 120 would either increase or decrease the production rate 920 of hydrogen gas within the hydrogen production system 100.

Figure 8:
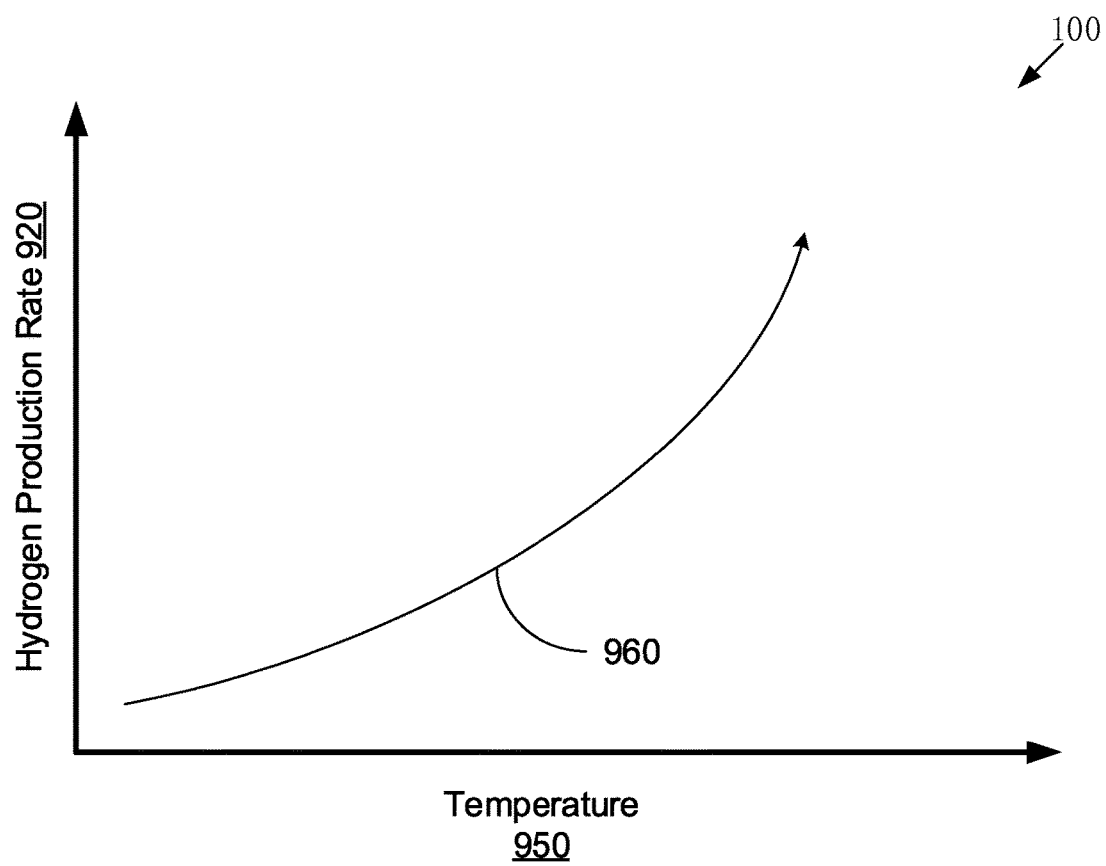
FIG. 8 is a graphical representation of a temperature variable of the chemical reaction in the hydrogen production system in accordance with an embodiment of the disclosed principles.

FIG. 8 shows a graphical representation of the hydrogen production rate 920 within the hydrogen production system 100 in relation to temperature 950. Dedicated testing and experimentation determined that the temperature 830 obtained by the chemical reaction is an important control variable regarding the production rate 920 and yield of hydrogen. It was found that as the temperature 950 of the reactor vessel 110 increased, the production rate 920 of hydrogen gas increased exponentially 960. The heat of the chemical reaction is used to heat the solution 120, which in turn increases the production rate 920 of hydrogen gas. This increased production then in turn increases the temperature 950 of the solution 120. With every 10 degree Celsius rise, the production rate 920 and heat of the chemical reaction doubles. Therefore, to regulate the production of hydrogen gas using the hydrogen production system 100, the temperature 950 of the reactor vessel 110 must be closely monitored and adjusted to maintain a steady constant production rate. An unchecked chemical reaction within the reactor vessel 110 could lead to a runaway reaction that could cause catastrophic failure of the hydrogen production system 100 if not monitored or controlled. Therefore, control mechanisms such as the cooling container 470 and temperature gauge 170 have been added to the hydrogen production system 100 to safely monitor and control the production of hydrogen.

Figure 9:
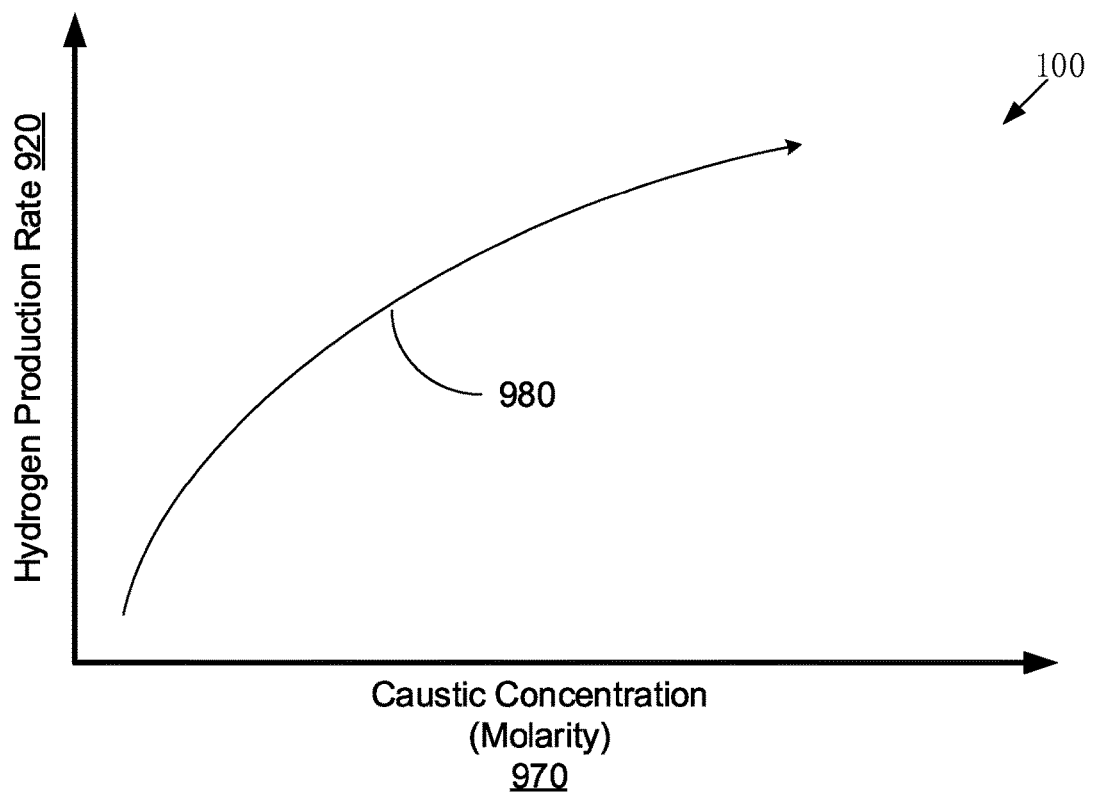
FIG. 9 is a graphical representation of a molarity variable of the chemical reaction in the hydrogen production system in accordance with an embodiment of the disclosed principles.

FIG. 9 shows a graphical representation of the hydrogen production rate 920 within the hydrogen production system 100 in relation to molarity 970. Dedicated testing and experimentation determined that the molarity 970 of the sodium hydroxide (NaOH) dissolved in the water (H₂O) of the solution 120 is an important control variable regarding the production rate 920 and yield of hydrogen. This relationship between the production of hydrogen and the molarity concentration 970 of the sodium hydroxide (NaOH) was found to be logarithmic 980. Therefore, as the concentration of the sodium hydroxide (NaOH) is increased within the solution 120, the gain of hydrogen production rate diminishes logarithmically. Testing showed that production levels below a certain ratio were not consistent and self-sustaining Therefore, for adequate and self-sustaining production of hydrogen using the hydrogen production system 100, the user should maintain a certain molarity concentration 970 of the solution 120. The molarity concentration 970 used should be based on the desired hydrogen production rate 920 of the user of the hydrogen production system 100.

Figure 10:
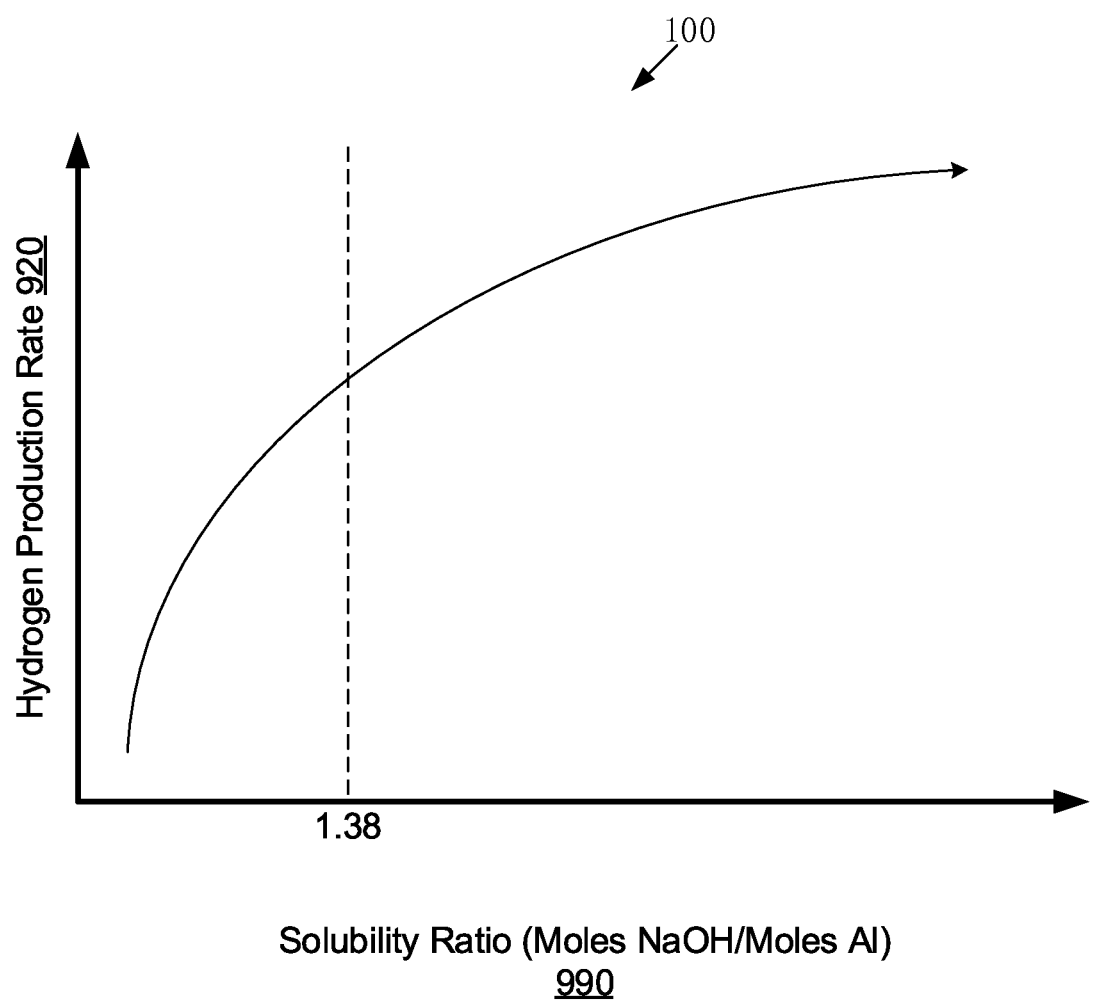
FIG. 10 is a graphical representation of a solubility variable of the chemical reaction in the hydrogen production system in accordance with an embodiment of the disclosed principles.

FIG. 10 shows a graphical representation of the hydrogen production rate 920 within the hydrogen production system 100 in relation to solubility 990. Dedicated testing and experimentation determined that the solubility relationship 990 between the sodium hydroxide (NaOH) and the aluminum (Al) is an important control variable regarding the production rate 800 and yield of hydrogen. It was found that the molecular ratio of sodium hydroxide (NaOH) to aluminum (Al) within the solution 120 should be kept above 1.38. If the molecular ratio falls below 1.38, the aluminum hydroxide (Al(OH)₃) that is formed as a byproduct of the chemical reaction and dissolved within the solution 120 will begin to precipitate out. This precipitation out of the solution 120 would allow the aluminum hydroxide (Al(OH)₃) to form in various precipitates depending on the system conditions. This precipitation could cause complications to the hydrogen production system 100 such that that aluminum hydroxide (Al(OH)₃) may coat the aluminum (Al) preventing further chemical reactions from occurring. Additionally, the aluminum hydroxide (Al(OH)₃) may attach to the sides or any surface within the interior of the reactor vessel 110 or may attach to or block a portion of the solution flow path 720 such that it may interfere with the stability of the hydrogen production system 100. By keeping the molecular ratio at 1.38 or above, the complications of the aluminum hydroxide (Al(OH)₃) precipitating out of the solution 120 may be avoided.

FIG. 11 provides a table 1000 of the above stated variables for operation of the hydrogen production system 100. Provided within FIG. 11 is a range of operation constraints 1010 determined through testing and experimentation of the hydrogen production system 100. Testing found that hydrogen production occurs when the surface area 930 of the metallic or semi-metal material 130 is unbounded. As long as the metallic or semi-metal material 130 is able to react with the solution 120, hydrogen production at a hydrogen production rate 920 will occur. More favorable results for the hydrogen production rate 920, were found when the metallic or semi-metal material 130 was aluminum (Al) molded into a flat plate configuration having a thickness between 0.01 to 0.1628 inches. Additionally, testing results concluded that hydrogen production could be observed when the temperature 950 was held within the range of 10 to 200 degrees Celsius for the hydrogen production system 100. However, more favorable hydrogen production rates 920 were observed when the temperature 950 of the solution 120 within the hydrogen production system 100 was maintained between 40 to 90 degrees Celsius. Furthermore, testing and experimentation found that the molarity 970 of the solution 120 allowed for hydrogen production when the solution 120 had a molarity 970 within the range of 0.1 to 8 moles per liter. Subsequent testing concluded that better hydrogen production rates 920 were obtained when the molarity 970 range of the solution 120 was kept between 1.5 to 4 moles per liter for the solution 120 in the hydrogen production system 100. Finally, testing and experimentation concluded that hydrogen production occurred when the solubility 990 of the caustic in relation to the metallic or semi-metal material 130 within the solution 120 of the hydrogen production system 100 was kept greater than one. Further testing, found that more favorable results occurred when the solubility 990 within the solution maintained a ratio greater that 1.38 to allow the byproduct to remain within the solution 120.

While the foregoing paragraphs discuss the variables of the hydrogen production system 100 that may be altered to produce various hydrogen production rates 920 and yields of hydrogen gas, these four variables (surface area 930, temperature 950, molarity 970, and solubility 990) are also used to vary the production of byproducts of the chemical reaction. The relationship between hydrogen gas production rate 920 and production rate of byproducts, such as aluminum hydroxide ($Al(OH)_3$), is a linear relationship. Therefore, if a user wishes to produce a greater rate of hydrogen gas, a greater production rate of a byproduct like aluminum hydroxide ($Al(OH)_3$) will be created. The same linear relationship is true in regards to the yield of hydrogen gas. If a user creates a greater amount of hydrogen gas, the consequent byproduct such as aluminum hydroxide ($Al(OH)_3$) will be greater. Therefore, these adjustable variables not only affect the production and yield of hydrogen gas, but the production and yield of a byproduct like aluminum hydroxide ($Al(OH)_3$) as well.

As stated above the byproduct of the chemical reaction will remain within the solution 120 under an appropriate set of system conditions. As testing an experimentation occurred, use of aluminum (Al) as the metallic or semi-metal material 130 and sodium hydroxide (NaOH) as the caustic allowed for the creation of a byproduct of aluminum hydroxide ($Al(OH)_3$). The aluminum hydroxide ($Al(OH)_3$) remained within the solution 120 after completion of the chemical reaction. Aluminum hydroxide ($Al(OH)_3$) is not soluble at a neutral pH level (e.g. water with no sodium hydroxide). Aluminum hydroxide ($Al(OH)_3$), however, is soluble at a high pH level. The higher the sodium hydroxide (NaOH) concentration within the solution 120, the more aluminum hydroxide ($Al(OH)_3$) that can be dissolved within the solution 120.

The solubility limit is determined by the ratio of moles of sodium hydroxide (NaOH) to moles of aluminum (Al) reacted. This solubility 990 is represented above in FIG. 10. If the ratio of moles of sodium hydroxide (NaOH) to moles of aluminum (Al) is greater than 1.38:1, the aluminum hydroxide ($Al(OH)_3$) will stay within the solution 120 and the solution 120 will appear clear to the user. If more aluminum (Al) is added to the solution 120 and the ratio of moles of sodium hydroxide (NaOH) to moles of aluminum (Al) falls between the range of 1.2-1.38:1, the solution will appear cloudy to the user as the aluminum hydroxide ($Al(OH)_3$) precipitates out of the solution 120 as the reaction occurs. This aluminum hydroxide ($Al(OH)_3$), becomes difficult to remove from the reactor vessel 110. Additionally, the hydrogen production rate 920 decreases to approximately half the hydrogen production rate 920 of the hydrogen production system 100 when this precipitation of aluminum hydroxide ($Al(OH)_3$) first occurs.

Aluminum hydroxide ($Al(OH)_3$) presents itself in nature in four naturally occurring polymorphs. Each of these polymorphs has a different crystalline arrangement that determines the structure and properties of the aluminum hydroxide ($Al(OH)_3$). The four polymorphs of aluminum hydroxide ($Al(OH)_3$) are gibbsite, bayerite, nordstrandite, and doyleite. Gibbsite is the most chemically stable and most common polymorph found of aluminum hydroxide ($Al(OH)_3$). Testing of the aluminum hydroxide ($Al(OH)_3$) produced by the disclosed hydrogen production system 100 revealed that the aluminum hydroxide ($Al(OH)_3$) was 99.0% of the gibbsite polymorph. Further information regarding gibbsite and its exact chemical composition and structure can be obtained from reading *Surface Complexation Modeling: Gibbsite* by Athanasios K. Karamalidis and David A. Dzombak which is incorporated herein by reference.

The byproduct recovery system 530 was envisioned to remove a byproduct such as the gibbsite polymorph of aluminum hydroxide ($Al(OH)_3$). To accomplish this and remove the gibbsite polymorph of aluminum hydroxide ($Al(OH)_3$) from the solution 120, three various methods were tested and applied. The first method to remove the gibbsite polymorph of aluminum hydroxide ($Al(OH)_1$) from the solution 120 involves the addition of an acid to the solution 120. Simply adding water ($H_2O$) to the solution 120 will not remove the aluminum hydroxide ($Al(OH)_3$) from the solution 120 because the ratio of sodium hydroxide (NaOH) to aluminum hydroxide ($Al(OH)_3$) would not change and there would not be enough critical mass to start self-crystallization within the solution 120 (explained below). When the solution 120 contains both aluminum hydroxide ($Al(OH)_3$) and sodium hydroxide (NaOH) the solution 120 has a basic pH level. The addition of an acid to the solution 120 adjusts the pH level allowing the aluminum hydroxide ($Al(OH)_3$) to precipitate out of the solution 120. If an acid is added to the solution 120 to precipitate the aluminum hydroxide ($Al(OH)_3$), the solution 120 is no longer a viable solution 120 for use in the production of hydrogen gas. For the solution 120 to be viable once again, the acid must be filtered out and replaced with sodium hydroxide (NaOH) for reuse.

The second method of removing the gibbsite polymorph of aluminum hydroxide ($Al(OH)_3$) from the solution 120 involves saturation of the solution 120. If the chemical reaction is allowed to continuously occur, the solution 120 will eventually progress past the saturation point of the solution 120. Past this point the aluminum hydroxide (Al(OH)$_3$) will not be dissolved within the solution 120 and will begin to precipitate out as it can no longer be held within the solution 120. When the solution 120 has passed beyond the saturation point, the solution 120 will appear cloudy as the aluminum hydroxide (Al(OH)$_3$) precipitates out. Although effective at allowing the aluminum hydroxide (Al(OH)$_3$) to be removed from the solution 120, this second method hinders the hydrogen production rate 920 of the hydrogen production system 100.

The third, and most promising, method of removing the gibbsite polymorph of aluminum hydroxide (Al(OH)$_3$) from the solution 120 involves allowing the solution 120 to settle. If the solution is removed from the reactor vessel 110, the solution 120 can be placed into a settling basin 750 as seen in FIG. 5. Within this settling basin 750 the solution 120 will be allowed to sit. Allowing the solution 120 to sit in this settling basin 750 allows the aluminum hydroxide (Al(OH)$_3$) to precipitate out gradually. As the solution 120 sits, aluminum hydroxide (Al(OH)$_3$) will begin to self-seed the solution 120 with the gibbsite polymorph of aluminum hydroxide (Al(OH)$_3$). Over time this self-seeding effect increases allowing the gibbsite polymorph of aluminum hydroxide (Al(OH)$_3$) to remove itself from the solution 120 and attach to other molecules of the gibbsite polymorph of aluminum hydroxide (Al(OH)$_3$). This creates a sort of snowball effect where the gibbsite polymorphs of aluminum hydroxide (Al(OH)$_3$) attach to one another. The self-settling method is preferred because all the insoluble products of the chemical reaction may be removed by a filter 730 before entering the settling basin 750. This ensures that no additional chemical are needed for the precipitation of the gibbsite polymorph of aluminum hydroxide (Al(OH)$_3$) and allows the solution 120 to be easily reused for the reaction of additional aluminum (Al).

Time is the important variable for the removal of the gibbsite polymorph of aluminum hydroxide (Al(OH)$_3$) in the self-seeding method. The longer the solution 120 is allowed to sit, more gibbsite will remove itself from the solution 120. The time required to remove the gibbsite polymorph of aluminum hydroxide (Al(OH)$_3$) using this method may be reduced by introducing gibbsite seed crystals to the solution 120 to speed up the process. Therefore, the byproduct recovery system 530 can be adjusted to accommodate an input of gibbsite seed crystals to be fed into the settling basin 750 for accelerated removal.

The gibbsite polymorph of aluminum hydroxide (Al(OH)$_3$) is useful in many commercial and industrial applications. Gibbsite is an important polymorph of aluminum hydroxide that is used in the production of aluminum. Since aluminum is the metallic or semi-metal material 130 used in the hydrogen production system 100, using the gibbsite polymorph of aluminum hydroxide (Al(OH)$_3$) to produce additional aluminum would be extremely advantageous.

Figure 12:
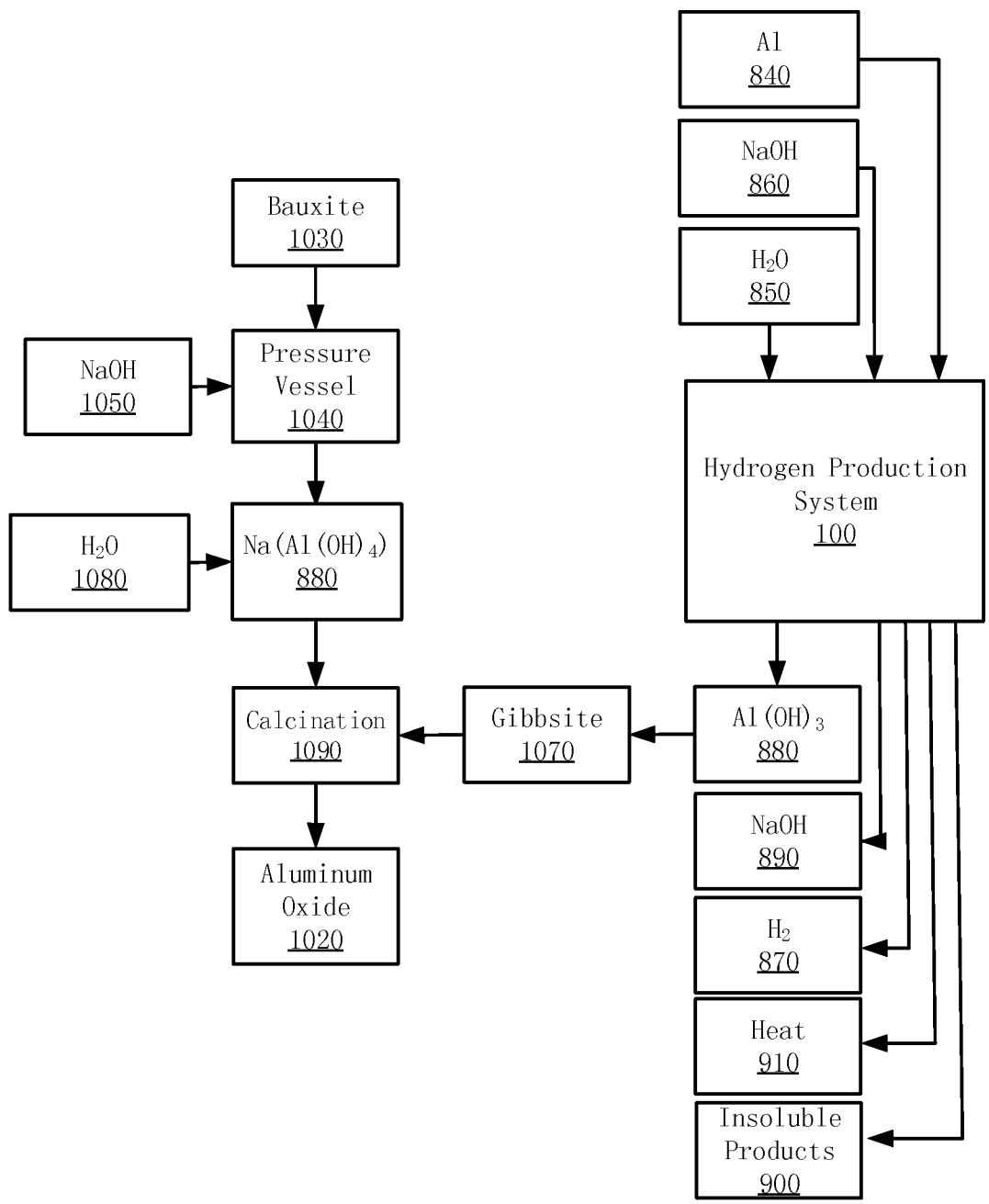
FIG. 12 is an exemplary flow chart representation of the hydrogen production system with a byproduct recovery system connected to an outside application employing the recovered byproducts of the byproduct recovery system in accordance with an embodiment of the disclosed principles.

Gibbsite is used in a production step during the process to create aluminum as seen in FIG. 12. FIG. 12 represents the Bayer process to create alumina (aluminum oxide) 1020 from bauxite 1030. The Bayer process is the first of multiple processes that end with the final production of commercial grade aluminum. As seen in FIG. 11, the Bayer process begins with the addition of bauxite 1030 to the system. The bauxite 1030 is crushed and milled and added to a pressure vessel 1040. Within the pressure vessel 1040 the bauxite 1030 is mixed with sodium hydroxide (NaOH) 1050 under pressure and at a constant temperature. Insoluble components resulting from this process are then filtered off. The resulting product of this pressurization is a soluble sodium aluminate (Na(Al(OH)$_4$)) 1060. The sodium aluminate (Na(Al(OH)$_4$)) 1060 is then cooled and enters a crystallization phase where both gibbsite 1070 and water 1080 are added to the Bayer process. The gibbsite 1070 and water 1080 along with the sodium aluminate (Na(Al(OH)$_4$)) 1060 are then heated in a calcification process 1090 to remove the water. Finally the Bayer process is complete resulting in a large yield of aluminum oxide 1020. The aluminum oxide 1020 then undergoes additional processes to become the commercial grade aluminum used today.

As stated above, the hydrogen production system 100 produces aluminum hydroxide (Al(OH)$_3$). This aluminum hydroxide (Al(OH)$_3$) is gibbsite. After the gibbsite is removed with the byproduct removal system 530 the gibbsite polymorph of aluminum hydroxide (Al(OH)$_3$) can then be injected from the hydrogen production system 100 and into the calcification process 1090 of the Bayer process. This may result in added savings for both the production of hydrogen gas and the production of aluminum. Since the production of hydrogen uses aluminum as the metallic or semi-metal material 130, using the byproduct gibbsite polymorph of the aluminum hydroxide (Al(OH)$_3$) helps create additional aluminum which can then be reused once again within the hydrogen production system 100.

Figure 13:
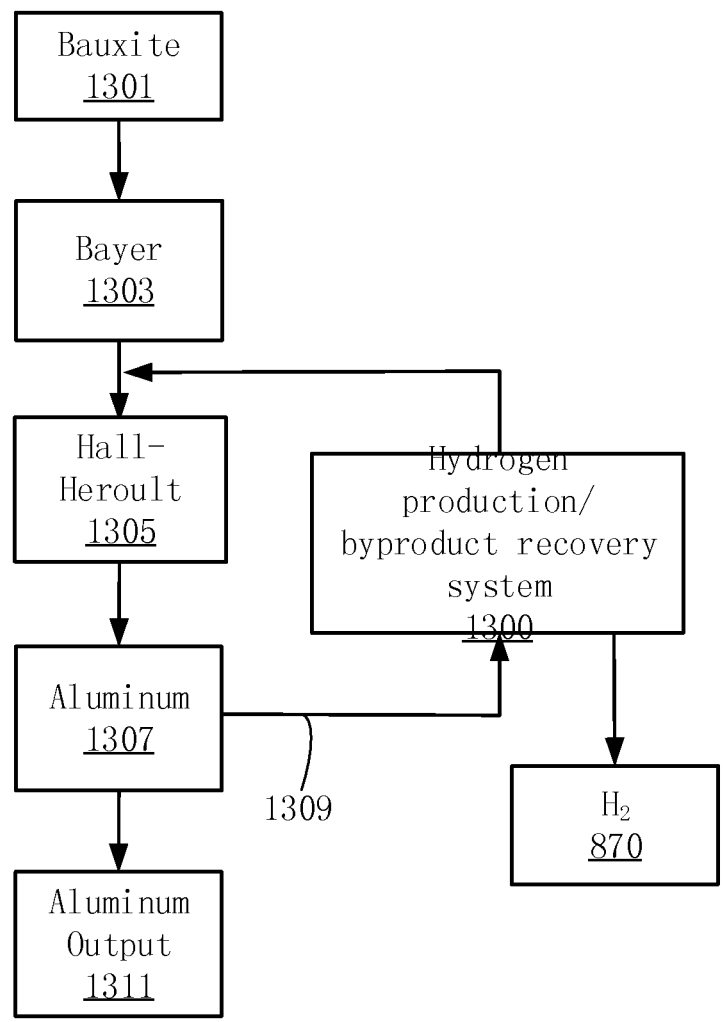
FIG. 13 is a flow chart view of the interaction between the complete aluminum production process and the hydrogen production system with the byproduct recovery system in accordance with an embodiment of the disclosed principles.
Figure 14:
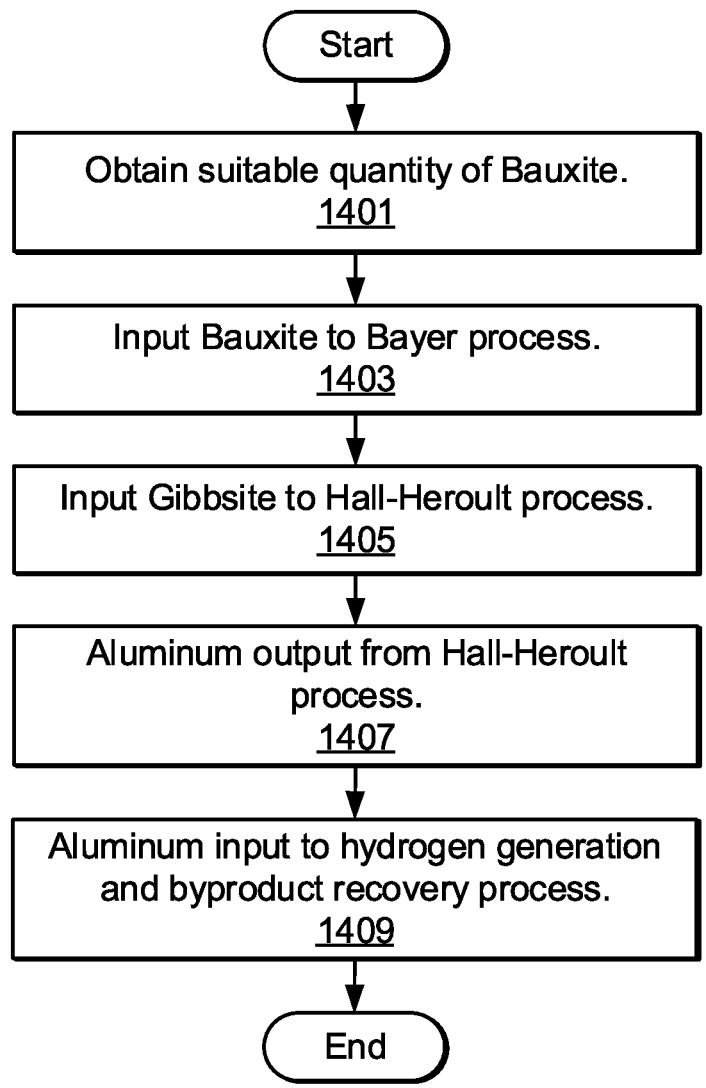
FIG. 14 is a step by step flow chart relating the interaction of the hydrogen production system and byproduct recovery system with the aluminum production process in accordance with an embodiment of the disclosed principles.

Referring now to FIGS. 13 and 14, the entire process 1400 to create aluminum (Al) is viewed with its relationship to the hydrogen production and byproduct recovery system 1300. As stated earlier, the aluminum production process begins (stage 1401) with the provision of a quantity of bauxite 1301. The bauxite 1301 then enters the Bayer process 1303 at stage 1403 where the bauxite 1301 is reformed to extract the aluminum oxide. At this point in the process, the byproduct, such as the gibbsite polymorph of aluminum hydroxide (Al(OH)$_3$), can be transported from the byproduct recovery system connected to the hydrogen production system 1300 and into the Bayer process 1303 for use.

After completion of the Bayer process 1303, the aluminum oxide enters a Hall-Héroult process 1305 at stage 1405 to complete the aluminum formation. As aluminum (Al) 1307 exits the Hall-Héroult process 1305 at stage 1407, the manufacturer of aluminum (Al) can decide the best use for the aluminum (Al) 1307.

In one example, a portion 1309 of the produced aluminum (Al) is fed into the hydrogen production system 1300 at stage 1409 to produce additional hydrogen gas as well as the gibbsite polymorph of aluminum hydroxide (Al(OH)$_3$) through the byproduct recovery system. The remaining aluminum (Al) 1311 may be sold or used in commercial applications. Additionally, the aluminum (Al) 1307 produced from the Hall-Héroult process 1305 and subsequent manufacturing may not yet meet purity standards for certain uses or customers.

In particular, the manufacturing of aluminum can result in dross and other undesired aluminum residue of various kinds Therefore, the aluminum manufacturer can recycle this undesired aluminum (Al) by feeding it into the hydrogen production system in stream 1309 to produce additional hydrogen gas as well as the gibbsite polymorph of aluminum hydroxide (Al(OH)3) through the byproduct recovery system.

Figure 15:
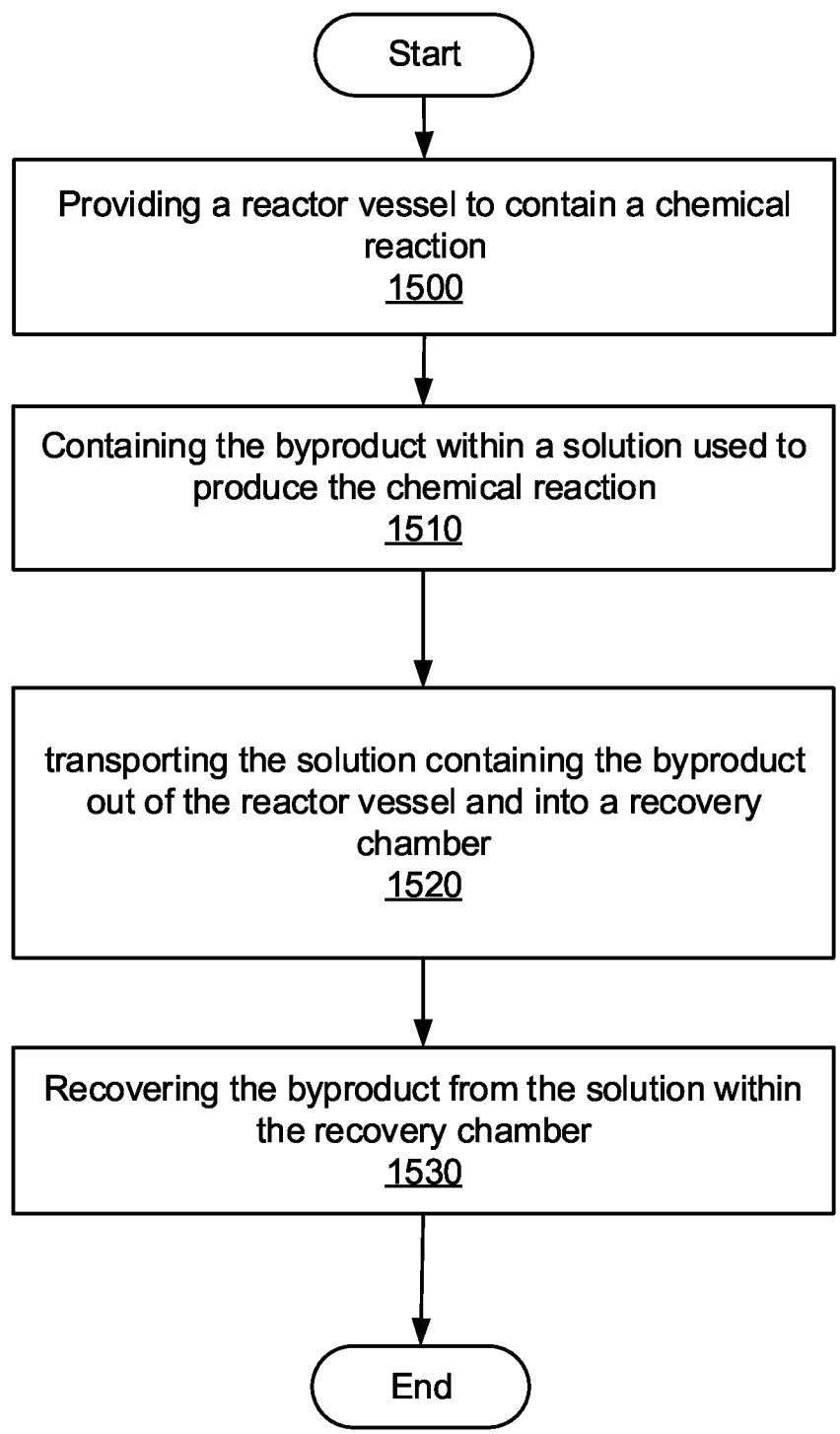
FIG. 15 is a flow chart showing a method to recover a byproduct of a chemical reaction to produce hydrogen gas using the hydrogen production system in accordance with an embodiment of the disclosed principles.

Referring now to FIG. 15, an exemplary succession of steps which are used to recover a byproduct from a hydrogen production system 100 is viewed. In block 1500, a reactor vessel 110 is provided to contain a chemical reaction to produce both hydrogen gas and a byproduct. The reactor vessel 110 may be any of the embodiments as disclosed above as long as it functions to the above stated standards needed for the production of hydrogen. The reactor vessel 110 would be able to receive both the solution 120 and the metallic or semi-metal material 130. The solution 120 would contain a combination of water as well as the caustic at a predetermined ratio depending on the needs of user operating the hydrogen production system 100. This predetermined ratio affects the generation 920 and yield of hydrogen gas produced as well as the generation and yield of the byproduct. In an embodiment of the present disclosure, this caustic would be sodium hydroxide (NaOH). Furthermore, in an embodiment of the present disclosure, the metallic or semi-metal material 130 used is aluminum (Al). The metallic or semi-metal material 130 is reacted with the solution 120 within the reactor vessel 110. This chemical reaction occurs when the metallic or semi-metal material 130 comes into contact with the solution 120. In the embodiments disclosed above this is commonly achieved by lowering the metallic or semi-metal material 130 into the solution 120 filling the reactor vessel 110. Additionally, in an alternate embodiment of the present disclosure the solution level 240 of the reactor vessel 110 may be modified to allow the metallic or semi-metal material 130 to contact the solution 120. Next in block 1510, the solution 120 after the chemical reaction has occurred contains the byproduct. As stated above the chemical reaction creates both hydrogen gas and a byproduct. In some of the above disclosed embodiments, aluminum (Al) is used as the metallic or semi-metal material 130 thereby creating aluminum hydroxide ($Al(OH)_3$) as the byproduct. It is also possible that after the chemical reaction occurs some insoluble products may be formed. The aluminum hydroxide ($Al(OH)_3$) is contained within the solution 120 after the reaction has taken place. This can be accomplished in a number of ways, but the aluminum hydroxide ($Al(OH)_3$) is usually either dissolved within the solution 120 or found within the solution 120 as a precipitate. The form in which the aluminum hydroxide ($Al(OH)_3$) is observed within the solution 120 is dependent on the four reaction variables discussed above. Then in block 1520, the solution 120 containing the byproduct is transported to a recovery chamber. This transportation is commonly achieved by a solution flow path 720 leaving the reactor vessel 110 and entering the recovery chamber. Furthermore, the recovery chamber may be a multitude of chambers or vessels used to recover the byproduct. As disclosed above, these types of recovery chambers may be a filter 730, settling basin 750 or a centrifuge chamber 780 operable to recover the byproduct. Other recovery chambers not described above may be used if additional or alternate recovery methods are used to obtain the byproduct. Finally, in block 1530, the byproduct is recovered from the solution 120 within the recovery chamber. This may occur by filtering out the insoluble products within the filter 730, or allowing the aluminum hydroxide ($Al(OH)_3$) to settle within a settling basin 750, or removing aluminum hydroxide ($Al(OH)_3$) from the solution 120 within a centrifuge chamber 780. Additionally, other methods such as the addition of an acid to the solution 120 may be applied to remove the aluminum hydroxide ($Al(OH)_3$) or byproduct from the solution 120. After the byproduct has been removed from the solution 120, the cleaned solution 120 could then be returned to the reactor vessel 110 for reuse in additional chemical reactions.

It will be appreciated that various systems and processes for producing hydrogen gas and recovering the byproduct of the production have been disclosed herein, along with methods and configurations for producing hydrogen gas and recovering the production byproduct. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

INDUSTRIAL APPLICABILITY

From the foregoing, it may be appreciated that the hydrogen production system and byproduct recover system disclosed herein may have industrial applicability in a variety of setting such as, but not limited to, use in the commercial manufacture of hydrogen and aluminum. Such disclosed system of collecting gaseous hydrogen may also be used, for example in powering hydrogen based machinery such as cars, aircraft or generators, in military applications for generating power, operating vehicles, or filling airships, balloons, or commercial storage devices.

Additionally in the field of hydrogen collection, such a hydrogen production system and byproduct recovery system involve materials and containment which can be easily transported from location to location with great ease and for multiple uses. Furthermore, the materials used in such hydrogen production system do not react chemically with each other and are stable when transported and not in combination to produce the hydrogen. The disclosed hydrogen production system may be assembled for both small and large scale production situations. The hydrogen production system and byproduct recover system provide a cost effective production platform which can be produced on demand in any environment or situation based on the needs of the user. Additionally, use of the byproduct recovery system may be employed to produce a valuable economic byproduct, such as gibbsite, that is used in the creation of high quality aluminum. This allows the production cost of the high quality aluminum to be reduced as gibbsite recovery from the byproduct recovery system provides a low cost alternative to current industry standards. Furthermore, use of the byproduct recovery system helps to reduce the environmental impact from aluminum production. Mining activity needed to obtain the bauxite and gibbsite would reduce by having the byproduct recovery system available to produce the gibbsite needs of the industry. Moreover, the byproduct recovery system provides an efficient and effective recycling platform for older aluminum. The older aluminum could be used as fuel for the hydrogen production system as well as the source for the creation of gibbsite for the production of new, higher quality aluminum. In addition, the hydrogen production system and the byproduct recover system does not require electrical power for proper operation. This lead to greater savings and portability when using each of the disclosed systems.

Moreover, use of the disclosed hydrogen production system produces a high quality of hydrogen gas. Hydrogen produced using the disclosed system has been tested and has exhibited purity levels up to and exceeding 99.8%. When aluminum is used as a fuel for the hydrogen production system, the byproduct recovery system can recover the gibbsite polymorph of aluminum hydroxide ($Al(OH)_3$). The byproduct gibbsite polymorph of aluminum hydroxide ($Al(OH)_3$) has been tested and evaluated at a 99.0% purity level. Furthermore, the disclosed hydrogen production has the additional benefits of being able to operate at low pressures and low temperatures. This in turn increases the overall safety of the disclosed hydrogen production system.

While the foregoing detailed description has addressed only specific embodiments, it is to be understood that the scope of the disclosure is not intended to be limiting. Thus, the breadth and spirit of this disclosure is intended to be broader than any of the embodiments specifically disclosed and/or encompassed within the claims appended hereto.

What is claimed is:

1. A byproduct recovery system, the byproduct recovery system comprising:
   a hydrogen production system, the hydrogen production system having a solution containing a caustic dissolved within water and a metallic or semi-metal material in contact with the solution to produce a chemical reaction, the chemical reaction producing hydrogen gas and a byproduct;
   a solution flow path allowing the solution to leave the hydrogen production system, the solution having the byproduct contained within the solution after the chemical reaction has occurred; and
   a recovery chamber, the recovery chamber attached to the solution flow path and able to receive the solution having the byproduct and able to remove the byproduct from the solution, wherein the byproduct contains both a soluble byproduct and an insoluble product and wherein the solution flow path enters a filter before continuing on to the recovery chamber, the filter able to receive the solution containing the soluble byproduct and the insoluble product and operable to remove the insoluble product from the solution.

2. The byproduct recovery system according to claim 1, wherein the recovery chamber is a settling basin, the settling basin able to receive the solution containing the byproduct for a predetermined length of time, the byproduct settling out of the solution and collecting at a bottom portion of the settling basin during the predetermined length of time.

3. The byproduct recovery system according to claim 2, wherein the settling basin is connected to a centrifuge chamber, the centrifuge chamber able to receive the solution from the settling basin through a continuation of the solution flow path and operable to produce a continuous spinning the solution at a high velocity, the continuous spinning of the solution at the high velocity able to remove the byproduct from the solution to produce a cleaned solution.

4. The byproduct recovery system according to claim 3, wherein the centrifuge chamber connects to a holding vessel, the holding vessel able to contain the cleaned solution from the centrifuge chamber and connected to the hydrogen production system to allow the cleaned solution to be reintroduced into the hydrogen production system for additional use in the production of hydrogen gas.

5. The byproduct recovery system according to claim 1, wherein the metallic or semi-metal is aluminum (Al).

6. The byproduct recovery system according to claim 1, wherein the caustic is sodium hydroxide (NaOH).

7. The byproduct recovery system according to claim 1, wherein the byproduct is aluminum hydroxide (Al(OH)$_3$).

8. A byproduct recovery system, the byproduct recovery system comprising:
   a reactor vessel; a hydrogen extraction point located on the reactor vessel;
   a solution filling at least part of an interior of the reactor vessel and containing a predetermined amount of a caustic in water such that the predetermined amount of the caustic dissolves within the water;
   a metallic or semi-metal material placed inside the reactor vessel and contacted by the solution, the metallic or semi-metal material consisting of a predetermined amount of metallic or semi-metal material such that a surface of the semi-metal material is exposed to the solution to produce both hydrogen and a byproduct;
   a solution flow path allowing the solution to leave the reactor vessel, the solution having the byproduct contained within the solution when it leaves the reactor vessel; and
   a recovery chamber, the recovery chamber attached to the solution flow path and able to receive the solution having the byproduct and able to remove the byproduct from the solution, wherein the byproduct contains both a soluble byproduct and an insoluble product and wherein the solution flow path enters a filter before continuing on to the recovery chamber, the filter able to receive the solution containing the soluble byproduct and the insoluble product and operable to remove the insoluble product from the solution.

9. The byproduct recovery system according to claim 8, wherein the recovery chamber is a settling basin, the settling basin able to receive the solution containing the byproduct for a predetermined length of time, the byproduct settling out of the solution and collecting at a bottom portion of the settling basin during the predetermined length of time.

10. The byproduct recovery system according to claim 9, wherein the settling basin is connected to a centrifuge chamber, the centrifuge chamber able to receive the solution from the settling basin through a continuation of the solution flow path and operable to produce a continuous spinning the solution at a high velocity, the continuous spinning of the solution at the high velocity able to remove the byproduct from the solution to produce a cleaned solution.

11. The byproduct recovery system according to claim 10, wherein the centrifuge chamber connects to a holding vessel, the holding vessel able to contain the cleaned solution from the centrifuge chamber and connected to the hydrogen production system to allow the cleaned solution to be reintroduced into the hydrogen production system for additional use in the production of hydrogen gas.

12. The byproduct recovery system according to claim 8, wherein the metallic or semi-metal is aluminum (Al).

13. The byproduct recovery system according to claim 12, wherein the caustic is sodium hydroxide (NaOH).

14. The byproduct recovery system according to claim 13, wherein the byproduct is aluminum hydroxide (Al(OH)$_3$).

\* \* \* \* \*